United States Patent [19]
Sebeny, Jr. et al.

[11] Patent Number: 5,696,347
[45] Date of Patent: Dec. 9, 1997

[54] MISSILE FUZING SYSTEM

[75] Inventors: Joseph L. Sebeny, Jr., Barrington, N.H.; Aaron T. Spettel, Arlington; F. Taft Murray, Cambridge, both of Mass.

[73] Assignee: Raytheon Company, Lexington, Mass.

[21] Appl. No.: 498,936

[22] Filed: Jul. 6, 1995

[51] Int. Cl.⁶ .................................... F42C 13/04
[52] U.S. Cl. .................. 102/214; 102/211; 244/3.19; 244/3.15
[58] Field of Search ................... 244/3.15, 3.16, 244/3.17, 3.19, 3.1; 102/211, 213, 214; 342/62, 68

[56] References Cited

U.S. PATENT DOCUMENTS

| | | | |
|---|---|---|---|
| 3,935,818 | 2/1976 | Johnson et al. | 102/213 |
| 3,964,695 | 6/1976 | Harris | 244/3.16 |
| 4,396,878 | 8/1983 | Cole et al. | 318/648 |
| 4,519,315 | 5/1985 | Arszman | 102/377 |
| 4,630,050 | 12/1986 | Johnson | 342/62 |
| 4,776,274 | 10/1988 | Kriz et al. | 102/213 |
| 4,823,700 | 4/1989 | Alker et al. | 102/476 |
| 4,895,075 | 1/1990 | Munzel | 102/214 |
| 5,359,934 | 11/1994 | Ivanov et al. | 102/214 |
| 5,366,179 | 11/1994 | Manhalter | 244/3.19 |

OTHER PUBLICATIONS

John Blakelock, Aircraft and Missiles, Wiley–Interscience, pp. 106–110, 260–273, 1991.

*Primary Examiner*—Michael J. Carone
*Assistant Examiner*—Christopher K. Montgomery
*Attorney, Agent, or Firm*—Donald F. Mofford; Glenn H. Lenzen, Jr.

[57] ABSTRACT

A fuzing system adapted for use by a guided missile to generate a detonation signal for a warhead carried by the missile. The missile has a seeker/tracker to track, and direct the missile towards, a target. The seeker/tracker has: a seeker, gimballed with respect to the body of the missile, for producing a signal representative of the angular deviation between the target and the missile; and, a ranging system for producing a signal representative of a range between the target and the missile. The fuzing system, in response to the range signals, produces a time-to-go signal, $t_{go}$, where $t_{go}$, related to the range between the missile and the target divided by the rate of change in such range. The seeker produced signal represents the line of sight angle between the missile and the target and wherein the processor, in response to the range signal and the line of sight angle signal produces a miss distance signal representative of a predicted distance, normal to the line of sight, at the time the remaining before the missile intercepts the target. A fragment velocity signal is produced representative of the velocity of fragments of the warhead divided by the predicted warhead miss distance.

10 Claims, 10 Drawing Sheets

MISSILE FUZING SYSTEM

BACKGROUND OF THE INVENTION

This invention relates generally to missile fuzing systems and more particularly to missile fuzing systems adapted for use in missiles required to destroy incoming tactical ballistic missiles.

As is known in the art, a fuzing system is used in an interceptor missile to detonate a warhead at the proper time in order to destroy a target. One type of fuzing system is a so-called conical fuzing system. The conical fuzing system includes a transmitter/receiver coupled to a fuzing system transmit/receive antenna. The antenna is mounted to side portions of the missile's body and produces a cone shaped antenna radiation pattern. The cone shaped radiation pattern has its attitude aligned with the longitudinal axis of the missile. Thus, the antenna pattern is at an acute angle with respect to the missile's longitudinal axis to thereby "look out" the sides of the missile in a predominately forward looking direction. Thus, the fuzing system relies on sensing the target as the target passes through the side looking cone shaped antenna pattern. While such a fuzing system is highly successful for a wide range of targets, with relatively high speed tactical ballistic missile targets, lost reaction time with conical fuzing systems may be undesirable, particularly when the interceptor missile is required to destroy the warhead of the target.

SUMMARY OF THE INVENTION

In accordance with the present invention, a fuzing system is provided for use with a guided interceptor missile. The missile includes a seeker/tracking system for producing target tracking and ranging signals and a guidance/fuzing computer, responsive to the target tracking and ranging signals for processing such signals to enable the seeker/tracking system to track the target and direct the missile towards the target, and for producing a detonation signal for a warhead carried by the missile.

With such an arrangement, the fuzing system produces a warhead detonation signal generated by the signals produced by the seeker/tracker in tracking, and directing the missile to, the target. Such seeker/tracking system produces signals including missile-to-target range signals, and missile-target angle tracking signals. The guidance/fuzing computer uses these signals to produce the detonation signal for the warhead. Thus, by using signals produced by the missile's seeker/tracking system the target is detected long before intercept and sufficient time is available to produce the warhead detonation signal.

In accordance with another feature of the invention, a fuzing system adapted for use by a guided missile to generate a detonation signal for a warhead carried by the missile is provided. The missile has a seeker/tracking system for producing signals to track the target, and direct the missile towards the target. The seeker/tracking system includes: a seeker, gimballed with respect to the body of the missile, for producing a signal representative of the angular deviation between the line of sight to the target and the boresight axis of the seeker/target tracking system; and, a ranging system for producing a signal representative of the range between the target and the missile. The fuzing system includes a computer for determining, in response to the seeker/ranging system produced signals, a detonation signal for the warhead.

In a preferred embodiment, the computer, in response to a ranging signal and an angle target tracking signal measured at a seeker of a seeker/tracker, transforms such measured signals from seeker based coordinates to coordinates based at the warhead, to produce, in the warhead based coordinates, a time-to-go signal, $t_{go}$, where $t_{go}$, is related to the range between the missile and the target divided by the rate of change in such range. The time-to-go signal $t_{go}$ represents the time remaining before the missile intercepts the target. The computer, in response to the range signal and the angle tracking signal, after transforming from the seeker based coordinates to the warhead based coordinates, computes a predicted warhead miss distance, at the time-to-go, $t_{go}$. Predetermined warhead fragment velocity data, representative of the velocity of fragments of the warhead after such warhead receives the detonation signal, is used by the computer to produce a fragment time signal. The fragment time signal is related to the predetermined fragment velocity divided by the warhead miss distance. The computer computes the difference between the time-to-go, signal and the fragment time signal $t_{go}$ to determine a burst time. The computed burst time is, after accounting for any processing time delays, loaded into a count-down counter. The computer counts down the burst time stored in the count-down counter and, when a count of zero is reached, the computer produces the detonation signal to detonate the warhead.

DESCRIPTION OF THE PREFERRED EMBODIMENTS

Figure 1:
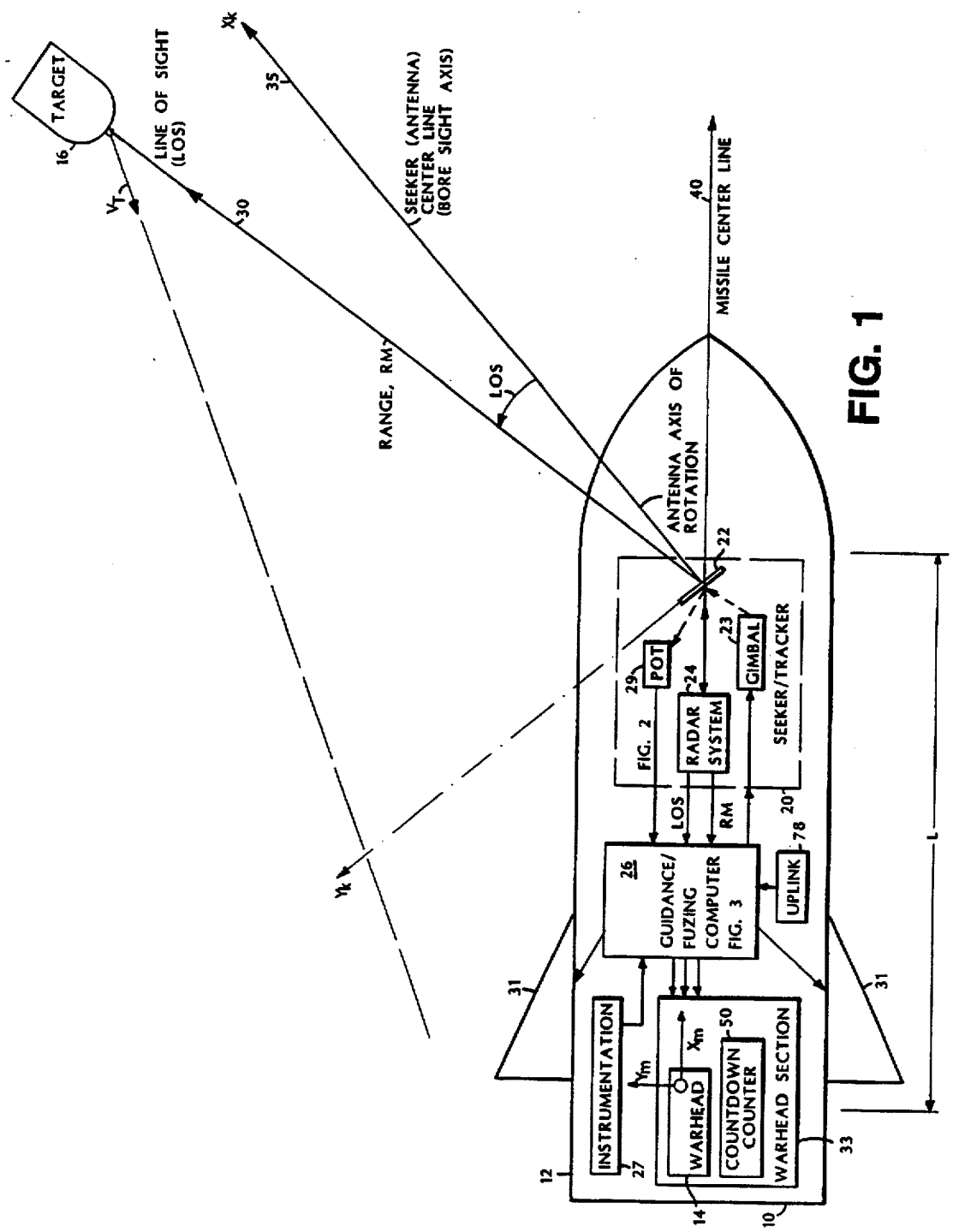
FIG. 1 is a diagrammatical sketch of a missile having a fuzing system in accordance with the invention, such fuzing system having a seeker/tracker, carried by the missile, for producing target tracking signals, and a guidance/fuzing computer, responsive to the seeker/tracker for producing signals to track the target and direct the missile towards the tracked target and, also, for generating a warhead detonation signal, in response to the seeker/tracker produced signals, to detonate a warhead in a warhead section of the fuzing system.

Referring now to FIG. 1, a fuzing system 10 adapted for use by a guided interceptor missile 12 to generate a detonation signal for a warhead 14 carried by the missile 12 to destroy target 16, here an incoming tactical ballistic missile, is shown. The missile 12 carries a guidance system 18 adapted to track, and direct the missile 12 towards, the target 16. The fuzing system 10 includes: (1) a seeker/tracker 20, here made up of a conventional monopulse antenna 22, gimballed by a gimbal system 23, in a conventional manner, with respect to the body of the missile 12; (2) a conventional radar system 24, here a pulsed Doppler radar system, for producing: (a) a signal representative of the angular deviation, LOS, between the target 16 and the missile 12; and, (b) a signal representative of a range, RM, between the target 16 and the missile 12 along the line of sight 30; and, (3) a guidance/fuzing computer 26, responsive to the produced angular deviation signal, LOS, the produced range signal, RM, and signals representative of the missile's accelerations and rotational rates (produced by instrumentation section 27), and signals representative of the angular position of the antenna 22 relative to the body of the missile (produced by potentiometers 29), in a conventional manner, for: (a) generating tracking signals for gimbal 23 to maintain track of the target 16 and guidance signals for control surfaces 31 to direct the missile 12 towards the target 16, in a conventional manner, and (b) generating a detonation signal for a warhead 14 in a manner to be described. Suffice it to say here, however, that the seeker/tracker 20 produces signals representative of (1) the range between the seeker 22 and the target 16, RM; and, (2) the elevation and azimuth angles, here for simplicity referred to as a composite, boresight error signal or line of sight signal angle tracking signal, LOS. (It should be noted that in the seeker based $X_k$-$Y_k$ coordinate system, the boresight error, or line of sight, signal, LOS, is the angle between: (i) the line from the seeker to the target; i.e., the line of sight, 30; and, (ii) the boresight axis 35 (i.e. seeker 22 centerline) of the seeker 22). The guidance/fuzing computer 26, as will be discussed in connection with FIG. 3, in response to the range signal, RM, and the angle tracking, LOS, signal, measured at a seeker of the seeker/tracker, transforms such measured signals from seeker based coordinates $X_k$, $Y_k$ to coordinates based at the warhead, $X_M$, $Y_M$ to produce, in the warhead based coordinates, a time-to-go signal, $t_{go}$, where $t_{go}$, related to the range, RM, between the missile and the target divided by a computed signal representative of the rate of change in such range, i.e. RMD. The time-to-go signal $t_{go}$ represents the time remaining before the missile 12 intercepts the target 16. The computer 26, in response to the range signal, RM, and the line of sight angle signal, LOS, after coordinate transforming from the seeker based coordinates to the warhead based coordinates, computes a predicted warhead miss distance, at the time-to-go, $t_{go}$, The predetermined warhead fragment velocity data, representative of the velocity of fragments of the warhead 14 after such warhead 14 receives the detonation signal, is used by the computer 26 to produce a fragment time signal. The fragment time signal is related to the fragment velocity divided by the warhead miss distance. The computer 26 computes the difference between the time-to-go signal, $t_{go}$, signal and the fragment time signal to determine a burst time. The computed burst time is, after accounting for any processing time delays, is loaded into a count-down counter 50. When a count of zero is reached in the count-down counter 50, the detonation signal is sent to detonate the warhead 14.

More particularly, and considering, for purposes of more easily understanding the invention, a two-dimensional model is shown in FIG. 1, with the seeker/antenna 22 having a boresight axis, or seeker center line, 35. In the coordinate system $X_k$, $Y_k$ Cartesian, seeker 22 based, coordinate system, shown in FIG. 1, the boresight axis 35 is along the $X_k$-axis, as shown. The angular deviation of the target 16 (i.e, the line of sight axis 30 from the seeker 22 to the target 16) from the boresight axis 35 is the line of sight angle LOS. This LOS angle, as noted above, is also referred to as the boresight error, BSE, and is used by the guidance/fuzing computer 26 to both track, and direct the missile 12 towards, the target 16, in a conventional manner. Here, the LOS angle and the range signal, RM, produced by the radar system 24 are used by the fuzing system 10 to generate the detonation signal for the warhead 14.

As noted above, the warhead 14 is located at a position on the body of the missile 12 which is different from the position of the pitch/yaw gimballed seeker 22. Thus, while the tracking, LOS, and ranging, RM, data are produced by signals received by the seeker 22, the seeker 22 will experience changes in its pitch/yaw orientation, relative to the body of the missile 12, and the missile 12 itself will generally be undergoing pitch, yaw and roll changes during the time the warhead detonation signal is being calculated. Therefore, the seeker based signals must be transformed to a coordinate system based at the warhead in order to properly produce the warhead detonation signal.

Such coordinate transformation is made by processing signals generated by the instrumentation 27 used to measure the acceleration and angular rotation of the missile 12 and the angular rotation of the seeker 22 relative to the body of the missile 12 and for producing signals representative of such measurements for computer 26. The instrumentation 27 includes: a longitudinal accelerometer, not shown, for producing a signal NMX representative of the acceleration mounted to the body of the missile 12, along its longitudinal axis 40; pitch/yaw accelerometers, not shown, mounted to the body of the missile, for producing signals NMY representative of accelerations along axis orthognal to the longitudinal axis 40; pitch/yaw gyros, not shown, mounted to the body of the missile for producing signals THMD representative of the missile's pitch and yaw angular body motion rates; and, pitch/yaw gimbal potentiometers, not shown, mounted to the gimballed seeker 22 for producing signals THG representative of the pitch/yaw gimbal angles of the seeker 22 relative to the missile's body 12.

The guidance/fuzing computer 26, in response to the ranging measurement signals, RM, and the LOS tracking signal produced by the seeker/tracker 22, are passed through conventional estimators and filters in the guidance/fuzing computer 26, which produces estimates (i.e., predictions) and smoothing of: predicted relative range, RP; predicted relative range rate, RDP; predicted relative range acceleration, RDDP; predicted relative target acceleration, NTRP; smoothed range, RS; smoothed range rate, RDS; and, smoothed target acceleration, NTRS, along the range vector, as follows:

Smoothing:

$$RS=RP+G*(RM-RP);$$

$$RDS = RDP + (H/\Delta t)*(RM-RP); \text{ and,}$$

$$NTRS = NTRP + (2*K/\Delta T^2)*(RM-RP).$$

Prediction:

$$RDDP = RS*LOSDS^2 + (NTRS-NMMR);$$

$$RDP = RDS + RDDP*\Delta t;$$

$$RP = RS + RDS*\Delta t + RDDP*\Delta t^2/2; \text{ and,}$$

$$NTRP = NTRS$$

where:
  ΔT=Measurement Data Interval;
  RS=Smoothed Relative Range;
  RDS=Smoothed Relative Range Rate;
  NTRS=Smoothed Target Acceleration Along the Range Vector;
  LOSDS=Smoothed Line of Sight Rate from the Guidance Kalman Filter 78;
  RM=Relative Range Measurement;
  RP=Predicted Relative Range;
  RDP=Predicted Relative Range Rate;
  NTRP=Predicted Relative Range Acceleration;
  NMMR=Missile Acceleration Measurement
Along Range Vector (Generated by transforming NMX and NMY from the body frame to the seeker frame using THG); and
  G,H,K are conventionally determined filter gains.

These produced estimates are processed in a conventional guidance Kalman filter 78, in computer 26 to generate relative seeker/target range and range rate vectors and target acceleration vectors in the Kalman frame; i.e., the seeker based coordinates $X_k$, $Y_k$. More particularly, the vector components produced by the guidance Kalman filter are:

$$YK = RS*LOSS;$$

$$YDK = RS*LOSDS + RDS*LOSS;$$

$$YNY = NTLS;$$

$$XK = RS*SQRT(1-LOSS2);$$

$$XDK = (RS*RDS - YK*YDK)/XK; \text{ and,}$$

$$XNT = NTRS;$$

where:
  YK=Relative Range Component along $Y_k$;
  LOSS=Smooth Line-of-Sight from the guidance Kalman filter 78;
  YDK=Relative Range Component Along $Y_k$;
  LOSDS=Smooth Line of Sight Rate from guidance Kalman Filter 78;
  NTLS=Smooth Target Acceleration Along $Y_k$ from the guidance Kalman filter;
  YNT=NTLS;
  XK=Relative Range Component along $X_k$;
  XDK=Relative Range Rate Component Along $X_k$;
  XNT=Smooth Target Acceleration Along $X_k$; and,
  SQRT=square root.

Figure 2:
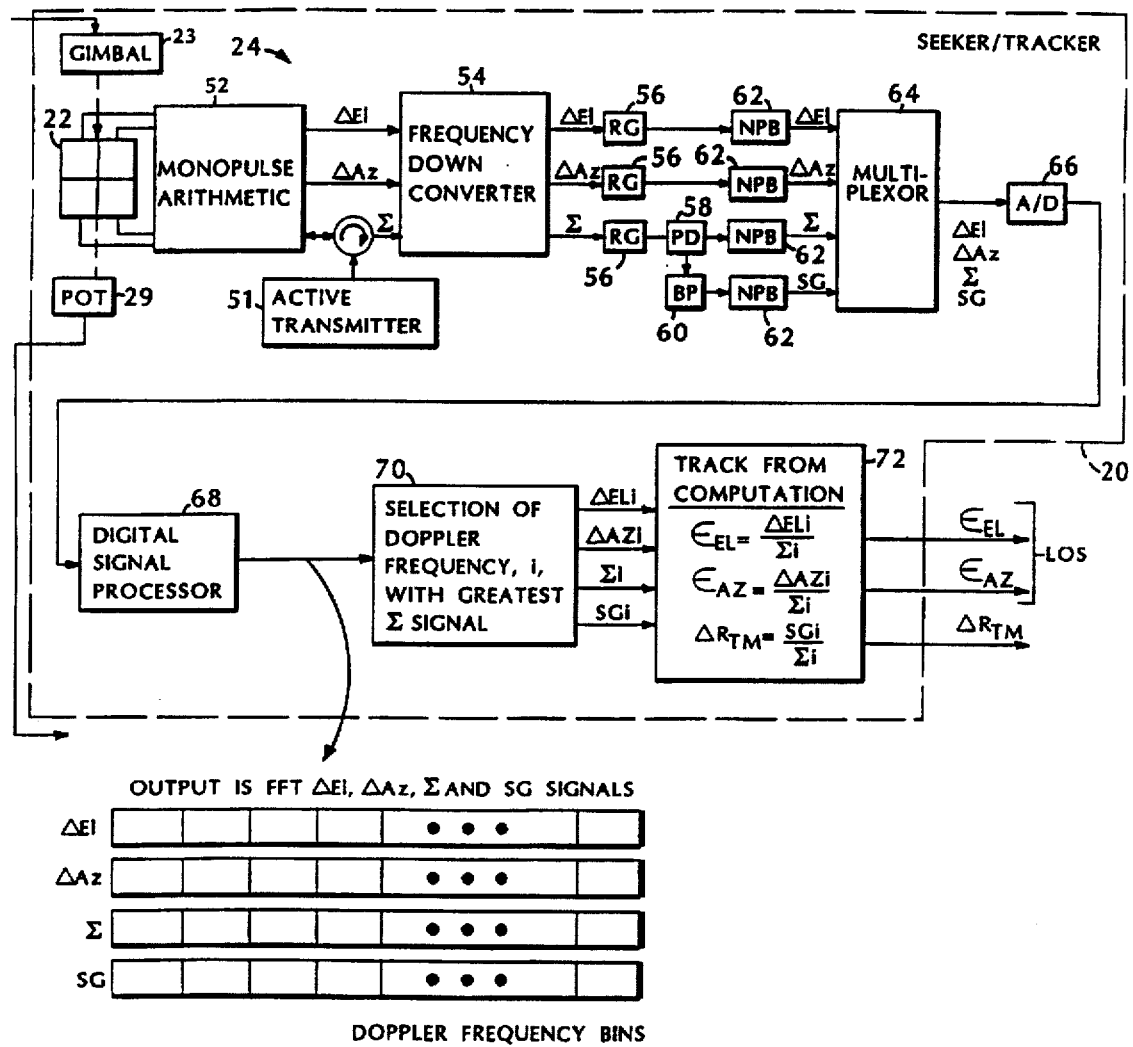
FIG. 2 is a functional block diagram of the seeker/tracker in FIG. 1.

It is first noted that the parameters generated above, were generated, as noted above, in a coordinate system having its origin at the seeker 22. The warhead 14, however, is mounted to the body of the missile a predetermined distance, here L, from the seeker 22, along the longitudinal axis 40 of missile 12. Thus, in order to properly produce a detonation signal for the warhead 14 the parameters generated by the seeker 22 must be translated to the position of the warhead 14. Thus, the relative vectors in the Kalman, frame (i.e., seeker 22 frame) are transformed to the current missile body frame using the seeker 22 gimbal angle THG and conventional coordinate transformation techniques:

$$|T_K^M| = \begin{vmatrix} \cos(THG) & -\sin(THG) \\ \sin(THG) & \cos(THG) \end{vmatrix}$$

where:

$|T_K^M|$ is the Transformation matrix from the Kalman Frame to the Missile Body Frame.

$$\begin{vmatrix} XM \\ YM \end{vmatrix} = |T_K^M| \begin{vmatrix} XK \\ YK \end{vmatrix} + \begin{vmatrix} L \\ 0 \end{vmatrix}$$

$$\begin{vmatrix} XDM \\ YDM \end{vmatrix} = |T_K^M| \begin{vmatrix} XDK \\ YDK \end{vmatrix}$$

$$\begin{vmatrix} XDDM \\ YDDM \end{vmatrix} = |T_K^M| \begin{vmatrix} XNT \\ YNT \end{vmatrix} - \begin{vmatrix} NMX \\ NMY \end{vmatrix}$$

where:
  XM=Relative Range Component Along $X_M$ shown in FIG. 1;
  YM=Relative Range Component Along $Y_M$ shown in FIG. 2;
  XDM=Relative Range Rate Component Along $X_M$;
  YDM=Relative Range Rate Component Along $Y_M$;
  XDDM=Relative Range Acceleration Along $X_M$;
  YDDM=Relative Range Acceleration Along $Y_M$;
  NMX=Missile Longitudinal Acceleration; Measurement Along $X_M$;
  NMY=Missile Transverse Acceleration Measurement Along $Y_M$;
  L=Distance of Warhead 14 From Seeker 22, Negative if Warhead 14 Is Rear Of Seeker 22;

Thus, as a result of this coordinate transformation the following parameters are translated to a coordinate system, $X_M$, $Y_M$ having its origin at the warhead 14. The detonation signal, or detonation signal time, is determined by a three step process: First a preliminary estimate of time to go until fragment/target impact occurs. This estimate of time to go, TGOEST, is computed by estimating when the relative range along the current missile $X_M$ axis will goes to zero in accordance with the following equation:

$$XM + XMD*TGOEST + 0.5\ XDDM*TGOEST^2 = 0.$$

The TGOEST equation above is solved by the following algorithm:

$$TEMP1 = (XM*XDDM)/(2.0*XDM^2)$$

$$TGOEST = (-XM/XMD)*(1.0 + TEMP1 + 2.0*TEMP1^2)$$

where: TEMP1=Temporary variable; and
  TGOEST=Estimated Time to go at which fragment/target impact occurs.

The second step is to compute the change in missile's body orientation between the current time and the time of fragment/target impact. This is computed by multiplying the missile body rate measurement times the estimated time to go as follows:

$$DELTPIM = THMD * TGOEST$$

where: DELTHM=change in missile orientation between current time and time of fragment impact;
THMD=Missile body rate measurement.

The third step is to transform the relative vectors from the current missile (i.e., warhead) based coordinate system, $X_M$, $Y_M$, to the predicted missile (i.e., predicted) ahead based coordinate system at the time of fragment/target impact. Such coordinate transformation is as follows:

$$|T_M^{PM}| = \begin{vmatrix} \cos(DELTHM) & -\sin(DELTHM) \\ \sin(DELTHM) & \cos(DELTHM) \end{vmatrix}$$

where:

$$|T_M^{PM}|$$

is the Transformation matrix from the current missile body orientation to the predicted missile body orientation at the time of fragment/target impact.

$$\begin{vmatrix} XPM \\ YPM \end{vmatrix} = |T_M^{PM}| \begin{vmatrix} XM \\ YM \end{vmatrix}$$

$$\begin{vmatrix} XDPM \\ YDPM \end{vmatrix} = |T_M^{PM}| \begin{vmatrix} XDM \\ YDM \end{vmatrix}$$

$$\begin{vmatrix} XDDPM \\ YDDPM \end{vmatrix} = |T_M^{PM}| \begin{vmatrix} XDDM \\ YDDM \end{vmatrix}$$

XPM=Relative range component along $X_{PM}$;
YPM=Relative range component along $Y_{PM}$;
XDPM=Relative range rate component along $X_{PM}$;
YDPM=Relative range rate component along $Y_{PM}$;
XDDPM=Relative range acceleration along $X_{PM}$;
YDDPM=Relative range acceleration along $Y_{PM}$;

This estimate of time to go (TGO) is computed by solving for when the relative range along the predicted missile $X_{PM}$ axis goes to zero. This time to go satisfies the following equation:

$$XPM + XDPM * TGO + 0.5 * XDDPM * TGO^2 = 0$$

The TGO is solved by the following algorithm:

$$TEMP2 = (XPM * XDDPM)/(2.0 * XDM^2)$$

$$TGO = (-XPM/XDPM)*(1.0 + TEMP2 + 2.0 * TEMP2_1)$$

where:
TEMP2=Temporary variable
TGO=Time to go at which fragment/target impact occurs.

The warhead center fragment travel time is computed by dividing the warhead miss distance (guidance system miss distance) by the fragment velocity. The warhead fragment miss distance in the $Y_{PM}$ direction occurs at time, TGO, from the current time. Thus, $$WMISS = YPM + YDPM * TGO + 0.5 * YDDPM * TGO^2;$$

where:
$Y_{PM}$ is the relative range component along the $Y_{PM}$ axis;
YDPM is the relative range rate component along the $Y_{PM}$ axis; and, YDDPM is the relative range acceleration along the $Y_{PM}$ axis; and,

TFRAG=WMISS/VFRAG, where:
WMISS=Warhead fragment miss distance
VFRAG=Known value
TFRAG=Fragment travel time from time of detonation signal to time of fragment/target impact.

This computation assumes that the center fragment velocity is orthognal to the warhead/missile centerline. The three dimension case discussed below presents the general case where the velocity vector is not orthognal to the warhead/missile centerline.

The preferred warhead detonation fragment direction is determined from the sign of WMISS in this planar example and by two warhead miss components orthognal to the missile centerline 40 in the three dimensional case discussed below. Thus:

FRAGMENT DIRECTION=SIGN (WMISS)

This is applicable when the warhead detonation mechanism has a directional capability.

The warhead burst delay time is the time to go minus the fragment travel time:

$$DTBURST = TGO - TFRAG$$

where: DTBURST=Warhead burst time delay

Finally, the fuze count down time to detonate is set with the above DTBURST value minus any known hardware/software system delay in count down counter 50.

Having describe the fuzing system 10 using a two-dimensional model, the fuzing system 10 will be described using a full three dimensional system. Thus, referring to FIG. 2, the seeker/tracker 20 includes an active transmitter 51 for generating radio frequency (RF) pulse waveform signal which is transmitted to the target 16 through the seeker antenna 22. The return RF signal from the target is received by the monopulse antenna 22 and processed by the monopulse arithmetic 52 to generate delta elevation channel signal, ΔEL, delta azimuth channel signal, ΔAZ, and sum channel signal, Σ, in a conventional manner. These RF signals are frequency down converted to a baseband low frequency in a conventional down converter 54. The three channel signals are also fed to range gates 56 to range gate such signals, in a conventional manner, about the predicted arrival time of each pulse in the signal. The active RF pulse waveform and the range gate positioning are controlled by computer tracking software algorithms in a conventional manner. Using a power divider 58, the sum channel signal is sent through a bi-phase switch 60 which inverts the sum channel signal phase angle by 180 degree at one half way through the width of the range gate to produce a conventional split gate signal, SG. This is generally referred to as a split gate. The now four channel signals (i.e., ΔEL, ΔAZ, Σ and SG) are narrow band filtered in narrow band filters 62, before entering the multiplexer 64. The multiplexer 64 samples each of the four channel signals (i.e., ΔEL, ΔAZ, Σ and SG) sequentially in time. This produces a single channel time series of analog samples of delta elevation ΔEL, delta azimuth, ΔAZ, sum, Σ and split gate signal SG.

These analog amplitude samples are analog-to-digital converted (A/D) 66 and processed by the Digital Signal Processor (DSP) 68 which is a special purpose dedicated computer. The DSP 68 computes the complex components of each of the four signals for each doppler frequency bin using a Fast Fourier Transform (FFT) algorithm.

The complex components are processed in a conventional manner, by a Doppler selection processor 70, in a conventional manner, to select the Doppler bin frequency, i, with the greatest sum signal magnitude. The tracking error calculation 72 of elevation angle ($\epsilon_{EL}$), azimuth angle ($\epsilon_{AZ}$) and missile-to-target range error ($\Delta R_{TM}$) are computed using conventional complex (i.e., a+jB) arithmetic. (It should be noted that while the Doppler selection 70 and tracking error 72 are shown functionally in the seeker/tracker 20 because the computations are performed in response to signals produced by the seeker/tracker 20, the computations are performed by the guidance/fuzing computer 26).

Figure 3:
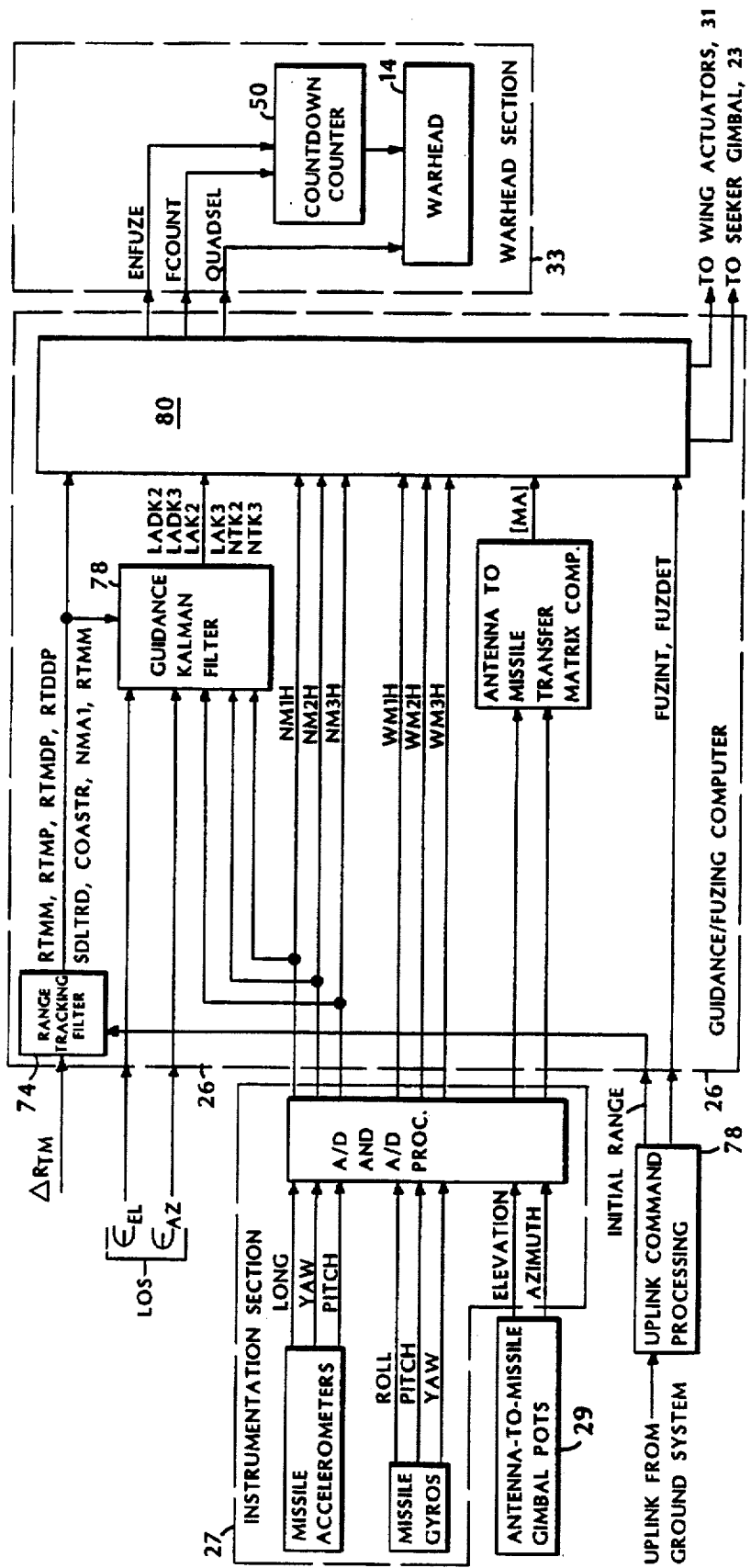
FIG. 3 is a functional block diagram of the guidance/fuzing computer in FIG. 1.
Figure 4:
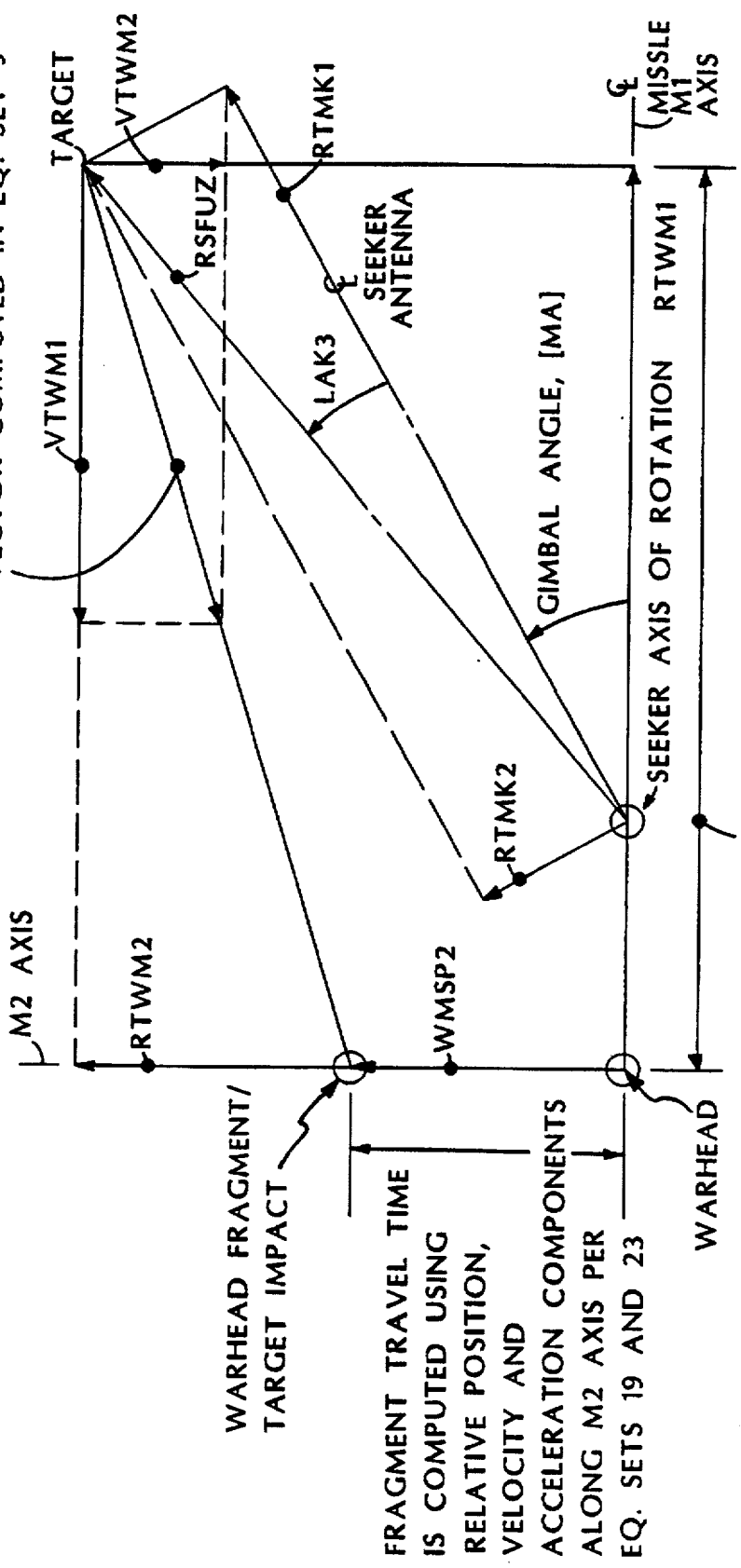
FIG. 4 is diagram showing coordinate systems, and parameters thereof, used by the guidance/fuzing computer of FIG. 3.

Referring now to FIGS. 3 and 4, the range error is an input to the range tracking filter 74. The range tracking filter 74 receives an initial value of range from a ground uplink, not shown, to an uplink processor 78, in a conventional manner. The guidance/fuzing computer 26 uses the measured missile-to-target range (RTMM) which is also an input to the guidance Kalman filter 78.

The elevation angle $\epsilon_{EL}$ and azimuth angle $\epsilon_{AZ}$ are inputs to the guidance Kalman filter 78. The guidance Kalman filter 78 outputs include the elevation and azimuth line of sight rates (i.e., LADK3 and LADK2, respectively), such signal being fed to the processor 80 of the guidance/fuzing computer 26, as shown.

The other inputs to the fuzing system processor 80 of the guidance/fuzing computer 26 include outputs from the instrumentation section 27 (i.e., missile accelerometers and gyros and antenna-to-missile gimbal potentiometers) and command parameters uplinked from the ground radar system, not shown, to the uplink processor 78.

The outputs of the guidance/fuzing computer 26 are fed to the warhead section 33 and include: (1) fuze countdown time value (FCOUNT) which is the warhead burst time delay; (2) the desired warhead quadrant selected (QUADSEL) if the warhead has a directionality capability; and, a fuze enable signal (ENFUZE).

As noted above, there are five major groups of inputs that are utilized by the fuzing system to determine the warhead burst time delay:

1) Active radar range measurement from a Ka band seeker transmitter and receiver;
2) Active guidance Kalman filter boresight error, line-of-sight rate and target acceleration estimates;
3) Seeker gimbal angles;
4) Missile body gyro measurements; and,
5) Missile body accelerometer measurements.

After the range measurement is filtered with a GHK filter 60, the range track filter 74 states are combined with guidance Kalman filter 78 states, to determine the relative closing geometry. The time-to-go to the warhead fragment/target impact and the fragment travel distance with the corresponding fragment travel time are computed in fuzing system processor 80. The warhead burst time delay is determined by "leading" the time-to-go to fragment/target impact by the fragment travel time.

The count-down counter (i.e. timer) 50 is loaded at the start of each 0th minor cycle with the fuze time delay (if valid). The fuze time delay is determined by adjusting the warhead burst time delay for the lag between when the measurement data was taken and when the count-down counter 50 is loaded. When the counter 50 reaches zero as it counts down in response to timing pulses FCOUNT from computer 26, the fire pulse, or detonation signal, is sent to the warhead 14. In addition, the warhead fragment miss distance, which is a vector that specifies the position of the target 16 relative to the warhead 14 when the fragment is predicted to impact the target, is used to choose the direction of fire for the selectable-blast-direction warhead 14.

When the range measurement or an active guidance boresight error estimate is invalid, the relative vectors are coasted by taking the previous cycle relative vectors and updating them to the current time, and missile frame (i.e., $X_M$, $Y_M$). A new fuze time delay is determined using the coasted relative vectors with current missile body measurements.

The equations described below use the parameters defined in FIG. 4. These parameters are listed below in TABLE 1:

TABLE 1

| ACRONYM | INPUTS DESCRIPTION | UNITS |
|---|---|---|
| FUZINT | Initiate Fuze Algorithm | — |
| RTMP | Predicted Range Missile-to-Target | m |
| RTMDP | Predicted Missile-to-Target Range Rate | m/s |
| RTDDP | Predicted Target Acceleration along LOS | m/s² |
| SDLTRD | Time Increment between Filter Measurement Updates | sec |
| COASTR | Range Coast Flag | — |
| RTMM | Measured Range Missile-to-Target | m |
| LADK2 | LOS Rate about K2 Axis | rad/s |
| LADK3 | LOS Rate about K3 Axis | rad/s |
| NMA1 | Missile Acceleration along Seeker (Antenna) K1 Axis, $X_K$ | m/s² |
| NM1H | NM1B Held From 3rd MCINT (previous cycle) | m/s² |
| NM2H | NM2B Held from 3rd MCINT (previous cycle) | m/s² |
| NM3H | NM3B Held from 3rd MCINT (previous cycle) | m/s² |
| LAK2 | LOS Angle about K2 Axis | rad |
| LAK3 | LOS Angle about K3 Axis | rad |
| NTK2 | Lateral Acceleration along K2 Axis | m/s² |
| NTK3 | Lateral Acceleration along K3 Axis | m/s² |
| MA11H | [1,1] Element of [MA] | — |
| MA12H | [1,2] Element of [MA] | — |
| MA13H | [1,3] Element of [MA] | — |
| MA21H | [2,1] Element of [MA] | — |
| MA22H | [2,2] Element of [MA] | — |
| MA23H | [2,3] Element of [MA] | — |
| MA31H | [3,1] Element of [MA] | — |
| MA32H | [3,2] Element of [MA] | — |
| MA33H | [3,3] Element of [MA] | — |
| WM1H | WM1B Held from 3rd MCINT (previous cycle) | rad/s |
| WM2H | WM2B Held from 3rd MCINT (previous cycle) | rad/s |
| WM3H | WM3B Held from 3rd MCINT (previous cycle) | rad/s |
| FUZDET | Fuze Detonate Enable | — |

FUZING SYSTEM PROCESSOR 80 PROCESSING

Figure 5:
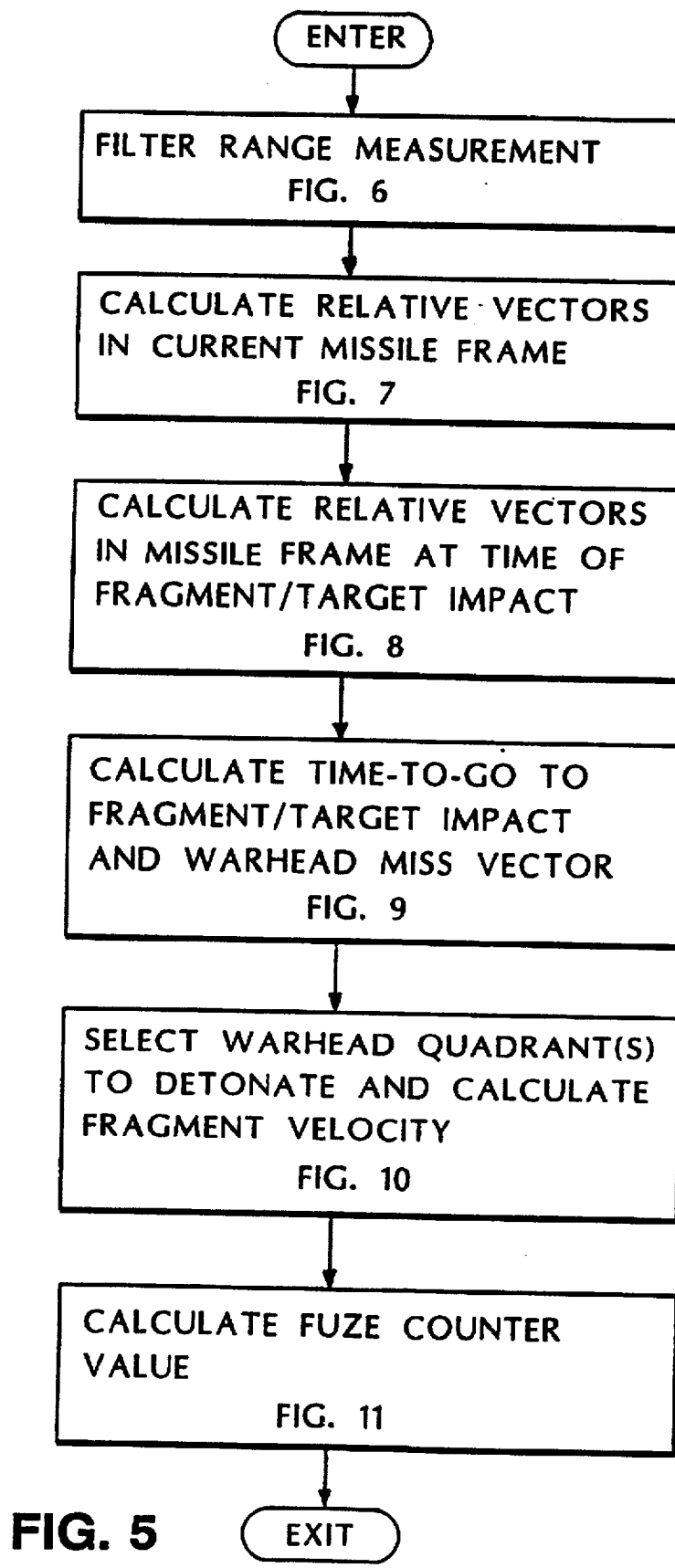
FIG. 5 is a flow diagram showing the overall steps performed by a processor of the guidance/fuzing computer in FIG. 3 in generating the detonation signal in FIG. 1.

The fuzing system processor 80 is executed every seeker radar cycle after the Initiate Fuze Algorithm (FUZINT) message is uplinked from a ground system, not shown. The processor 80 flow chart is shown in FIG. 5. The fuzing system processor 80 computes the intermediate parameters listed below in TABLE 2, and such intermediate parameters must remain unchanged between processor 80 computation cycles:

TABLE 2

| ACRONYM | INTERMEDIATES DESCRIPTION | UNITS |
|---|---|---|
| FPASS | First Pass Initialization Flag | — |
| RPFUZ | Fuze Range Filter Predicted Range | m |
| RDPFUZ | Fuze Range Filter Predicted Range Velocity | m/s |
| NTRPFUZ | Fuze Range Filter Predicted Target | m/s² |

TABLE 2-continued

INTERMEDIATES

| ACRONYM | DESCRIPTION | UNITS |
|---|---|---|
| GFUZ | Fuze Range Filter Gain G (Acceleration along Range) | — |
| HFUZ | Fuze Range Filter Gain H | — |
| KFUZ | Fuze Range Filter Gain K | — |
| DTFILT | Time between Range Measurements for Range Filter | sec |
| RERR | Range Prediction Error | m |
| RSFUZ | Fuze Range Filter Smoothed Range | m |
| RDSFUZ | Fuze Range Filter Smoothed Range Velocity | m/s |
| NTRSFUZ | Fuze Range Filter Smoothed Target Acceleration along Range | $m/s^2$ |
| RDDFUZ | Relative Acceleration along Range Vector | $m/s^2$ |
| NMM1 | Missile Acceleration along M1 Axis | $m/s^2$ |
| NMM2 | Missile Acceleration along M2 Axis | $m/s^2$ |
| NMM3 | Missile Acceleration along M3 Axis | $m/s^2$ |
| RTMK1 | Range Missile-to-Target along K1 Axis | m |
| RTMK2 | Range Missile-to-Target along K2 Axis | m |
| RTMK3 | Range Missile-to-Target along K3 Axis | m |
| VTMK1 | Velocity Warhead-to-Target along K1 Axis | m/s |
| VTMK2 | Velocity Warhead-to-Target along K2 Axis | m/s |
| VTMK3 | Velocity Warhead-to-Target along K3 Axis | m/s |
| NTK1 | Target Acceleration along K1 Axis | $m/s^2$ |
| RTWM1 | Range Warhead-to-Target along M1 Axis | m |
| RTWM2 | Range Warhead-to-Target along M2 Axis | m |
| RTWM3 | Range Warhead-to-Target along M3 Axis | m |
| VTWM1 | Velocity Warhead-to-Target along M1 Axis | m/s |
| VTWM2 | Velocity Warhead-to-Target along M2 Axis | m/s |
| VTWM3 | Velocity Warhead-to-Target along M3 Axis | m/s |
| NTM1 | Target Acceleration along M1 Axis | $m/2^2$ |
| NTM2 | Target Acceleration along M2 Axis | $m/s^2$ |
| NTM3 | Target Acceleration along M3 Axis | $m/s^2$ |
| ATWM1 | Acceleration Warhead-to-Target along M1 Axis | $m/s^2$ |
| ATWM2 | Acceleration Warhead-to-Target along M2 Axis | $m/s^2$ |
| ATWM3 | Acceleration Warhead-to-Target along M3 Axis | $m/s^2$ |
| FIML | Roll Change from Last Cycle to Current Missile Frame | rad |
| THML | Pitch Change from Last Cycle to Current Missile Frame | rad |
| SIML | Yaw Change from Last Cycle to Current Missile Frame | rad |
| WM1CST | Body Rate about M1 Axis Held for Coasting | rad/s |
| WM2CST | Body Rate about M2 Axis Held for Coasting | rad/s |
| WM3CST | Body Rate about M3 Axis Held for Coasting | rad/s |
| CFIML | Cosine of Roll Change (FIML) | — |
| SFIML | Sine of Roll Change (FIML) | — |
| CTHML | Cosine of Pitch Change (THML). | — |
| STHML | Sine of Pitch Change (THML) | — |
| CSIML | Cosine of Yaw Change (SIML) | — |
| SSIML | Sine of Yaw Change (SIML) | — |
| ML11 | Element [1,1] of Last to Current Missile Frame Transformation | — |
| ML12 | Element [1,2] of Last to Current Missile Frame Transformation | — |
| ML13 | Element [1,3] of Last to Current Missile Frame Transformation | — |
| ML21 | Element [2,1] of Last to Current Missile Frame Transformation | — |
| ML22 | Element [2,2] of Last to Current Missile Frame Transformation | — |
| ML23 | Element [2,3] of Last to Current Missile Frame Transformation | — |
| ML31 | Element [3,1] of Last to Current Missile Frame Transformation | — |
| ML32 | Element [3,2] of Last to Current Missile Frame Transformation | — |
| ML33 | Element [3,3] of Last to Current Missile Frame Transformation | — |
| RTWM1U | Range Warhead-to-Target along M1 Updated from Last cycle | m |
| RTWM2U | Range Warhead-to-Target along M2 Updated from Last Cycle | m |
| RTWM3U | Range Warhead-to-Target along M3 Updated from Last Cycle | m |
| VTWM1U | Velocity Warhead-to-Target along M1 Updated from Last Cycle | m/s |
| VTWM2U | Velocity Warhead-to-Target along M2 Updated from Last Cycle | m/s |
| VTWM3U | Velocity Warhead-to-Target along M3 Updated from Last Cycle | m/s |
| NTM1U | Target Acceleration along M1 Updated from Last Cycle | $m/s^2$ |
| NTM2U | Target Acceleration along M2 Updated from Last Cycle | $m/s^2$ |
| NTM3U | Target Acceleration along M3 Updated from Last Cycle | $m/s^2$ |
| TEMP1 | Intermediate Value for WTGOEST Calculation | — |
| WTGOEST | Estimate of Time-to-Go to Warhead Fragment/Target Impact | sec |
| FIPM | Roll Change from Current Missile Frame to Predicted Frame | rad |
| THPM | Pitch Change from Current Missile Frame to Predicted Frame | rad |
| SIPM | Yaw Change from Current Missile Frame to Predicted Frame | rad |
| CFIPM | Cosine of Roll Change (FIPM) | — |
| SFIPM | Sine of Roll Change (FIPM) | — |
| CTHPM | Cosine of Pitch Change (THPM) | — |
| STHPM | Sine of Pitch Change (THPM) | — |
| CSIPM | Cosine of Yaw Change (SIPM) | — |
| SSIPM | Sine of Yaw Change (SIPM) | — |
| PM11 | Element [1,1] of Missile to Predicted Missile Transformation | — |
| PM12 | Element [1,2] of Missile to Predicted Missile Transformation | — |
| PM13 | Element [1,3] of Missile to Predicted Missile Transformation | — |
| PM21 | Element [2,1] of Missile to Predicted Missile Transformation | — |
| PM22 | Element [2,2] of Missile to Predicted Missile Transformation | — |
| PM23 | Element [2,3] of Missile to Predicted Missile Transformation | — |
| PM31 | Element [3,1] of Missile to Predicted Missile Transformation | — |
| PM32 | Element [3,2] of Missile of Predicted Missile Transformation | — |
| PM33 | Element [3,3] of Missile of Predicted Missile Transformation | — |
| RTWP1 | Range Warhead-to-Target along Predicted M1 | m |
| RTWP2 | Range Warhead-to-Target along Predicted M2 | m |
| RTWP3 | Range Warhead-to-Target along Predicted M3 | m |
| VTWP1 | Velocity Warhead-to-Target along Predicted Mi | m/s |
| VTWP2 | Velocity Warhead-to-Target along Predicted M2 | m/s |
| VTWP3 | Velocity Warhead-to-Target along Predicted M3 | m/s |
| ATWP1 | Acceleration Warhead-to-Target along Predicted M1 | $m/s^2$ |
| ATWP2 | Acceleration Warhead-to-Target along Predicted M2 | $m/s^2$ |
| ATWP3 | Acceleration Warhead-to-Target along Predicted M3 | $m/s^2$ |
| TEMP2 | Intermediate Value for WTGO Calculation | — |
| WTGO | Time-to-Go to Warhead Fragment Target Impact | sec |
| ITAN | Inverse of Tangent of Warhead Fuze Angle | — |
| OLDTGO | Previous Iteration of WTGO | sec |
| COUNT | Counter for Number of Iterations | — |
| TEMP3 | Intermediate of Iterative Solution | $m^2$ |
| TEMP4 | Intermediate of Iterative Solution | $m^2$ |
| TEMP5 | Intermediate of Iterative Solution | m |
| TEMP6 | Intermediate of Iterative Solution | m/s |

TABLE 2-continued

INTERMEDIATES

| ACRONYM | DESCRIPTION | UNITS |
|---|---|---|
| CONVRG | Convergence of Iterative Solution | sec |
| WMSP1 | Warhead Miss along Predicted M1 Axis | m |
| WMSP2 | Warhead Miss along Predicted M2 Axis | m |
| WMSP3 | Warhead Miss along Predicted M3 Axis | m |
| WMSMAG | Warhead Miss Vector Magnitude | m |
| WMSANG | Warhead Miss Angle about Predicted M1 Axis | rad |
| DIR | Warhead Fire Direction | — |
| WANGDIF | Difference between Warhead Fire Direction and Miss Angle | rad |
| BVFRAG | Nominal Fragment Velocity | m/s |
| MVFRAG | Slope of Fragment Velocity versus Angle Difference (WANGDIF) | (m/s)/rad |
| VFRAG | Fragment Velocity | m/s |
| DTBURST | Warhead Burst Time Delay | sec |
| DTFUZE | Fuze Time Delay | sec |
| TFRAG | Fragment Travel Time | sec |

TABLE 3

CONSTANTS

| ACRONYM | DESCRIPTION | UNITS |
|---|---|---|
| BETA | Fuze Range Filter Smoothing Parameter | — |
| T80 | Time Between Processing Cycles | sec |
| RLIM | Minimum Range Measurements Processed | m |
| BSELIM | Maximum Bore-sight Error Estimates Processed | rad |
| SKTOWR | Seeker to Warhead Displacement | M |
| WARANG | Warhead Cone Angle | rad |
| TOLER | Tolerance of Convergence of Time-to-Go Iterations | sec |
| B1VFRG | Nominal Fragment Velocity for 1 Detonator Case | m/s |
| M1VFRAG | Slope of Fragment Velocity vs Angle for 1 Detonator Case | (m/s)/rad |
| B2VFRAG | Nominal Fragment Velocity for 2 Detonator Case | m/s |
| M2VFRAG | Slope of Fragment Velocity vs Angle for 2 Detonator Case | (m/s)/rad |
| WARRAD | Warhead Radius | m |
| CYCLAG | Lag from Data Valid to Counter Initiation | sec |
| DELAYS | Hardware Delays between Fire Pulse and Fragment Ejection | sec |
| WRTOCG | Warhead to Center of Gravity (CG) Displacement | m |

Figure 11:
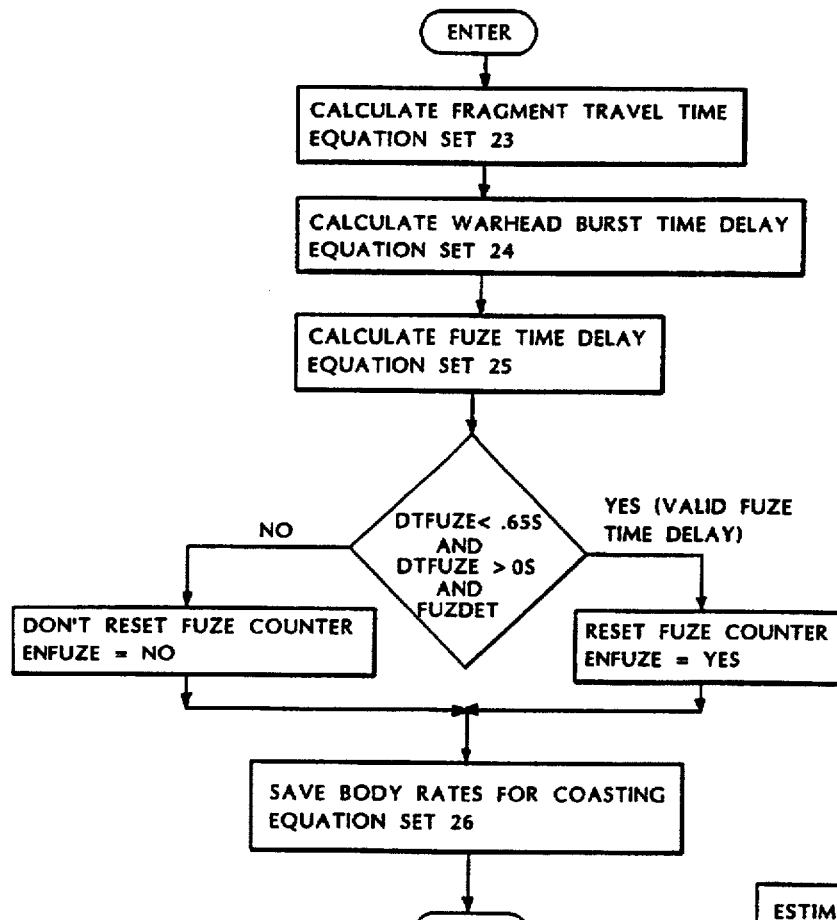
FIG. 11 is a flow diagram showing the steps performed by the processor of the guidance/fuzing computer in FIG. 3 in determining a the warhead detonation signal.

The fuzing system 10 processing is shown in FIG. 5 and includes:

1) Performing filter range measurements (FIG. 6);
2) Calculate Relative Range Vectors in Current Missile Frame (FIG. 7);
3) Calculate Relative Vectors in Missile Frame at Time of Impact (FIG. 8);
4) Calculate Time-To-Go to Fragment/Target Impact and Warhead Miss Distance (FIG. 9);
5) Select Warhead Quadrant(s) to Detonate and Calculate Fragment Velocity (FIG. 10); and,
6) Calculate Fuze Counter Value (FIG. 11).

FILTER RANGE MEASUREMENTS

Figure 6:
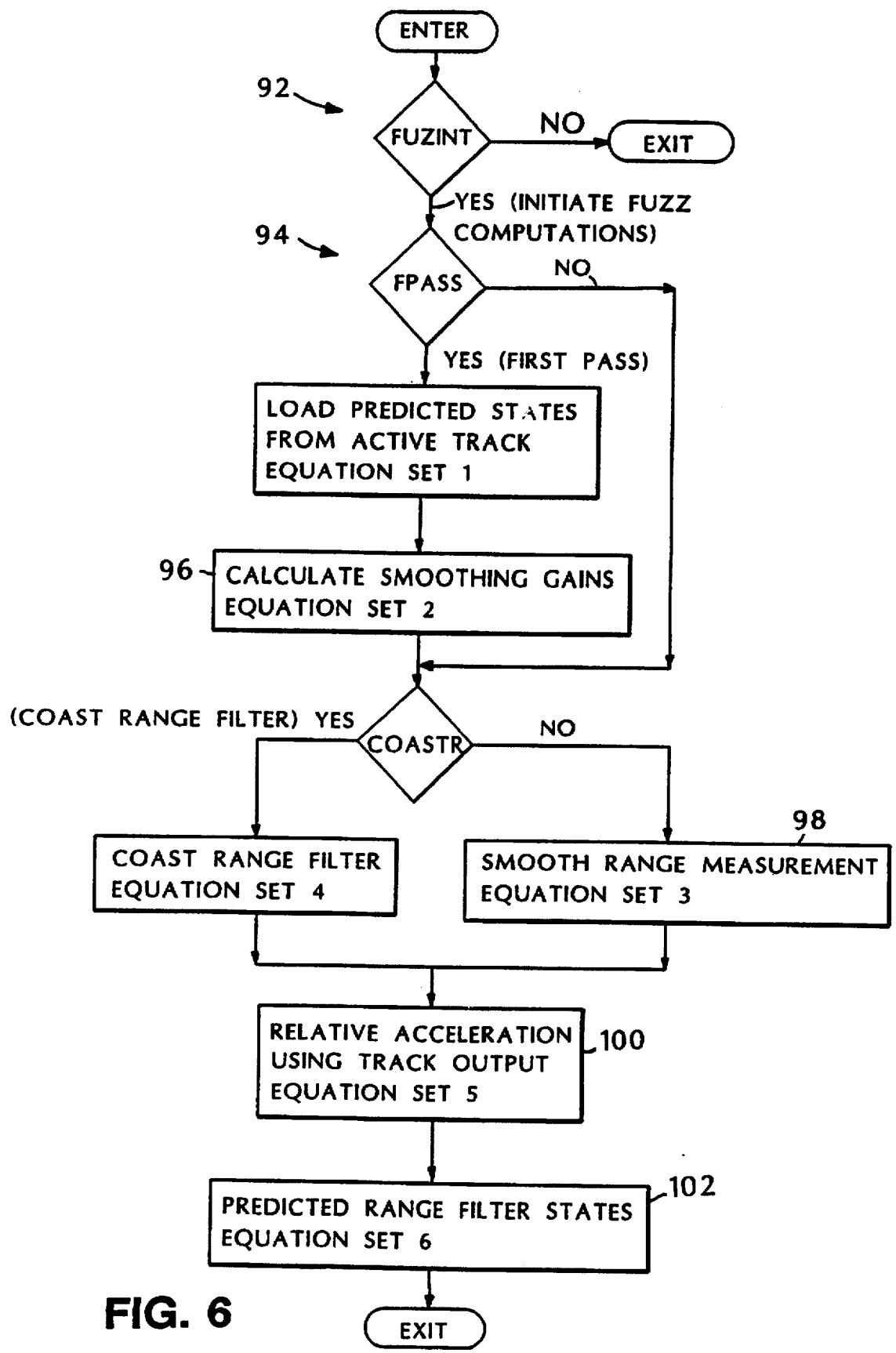
FIG. 6 is a flow diagram showing the steps performed by a range filter of the processor of the guidance/fuzing computer of FIG. 3.

Referring to FIG. 6, the following functions are performed:

1) Determine if processing is to be executed based on the initiate FUZE algorithm logical (FUZINIT) via the uplink (92)
2) Initialize the range filter predicted states on the first pass (94);
3) Calculate the range filter smoothing gains on the first pass (96);
4) Smooth the range measurement or coast the range filter (98);
5) Calculate the relative acceleration along the range vector (100); and,
6) Predict the range filter states for the next radar cycle execution (102).

Figure 7:
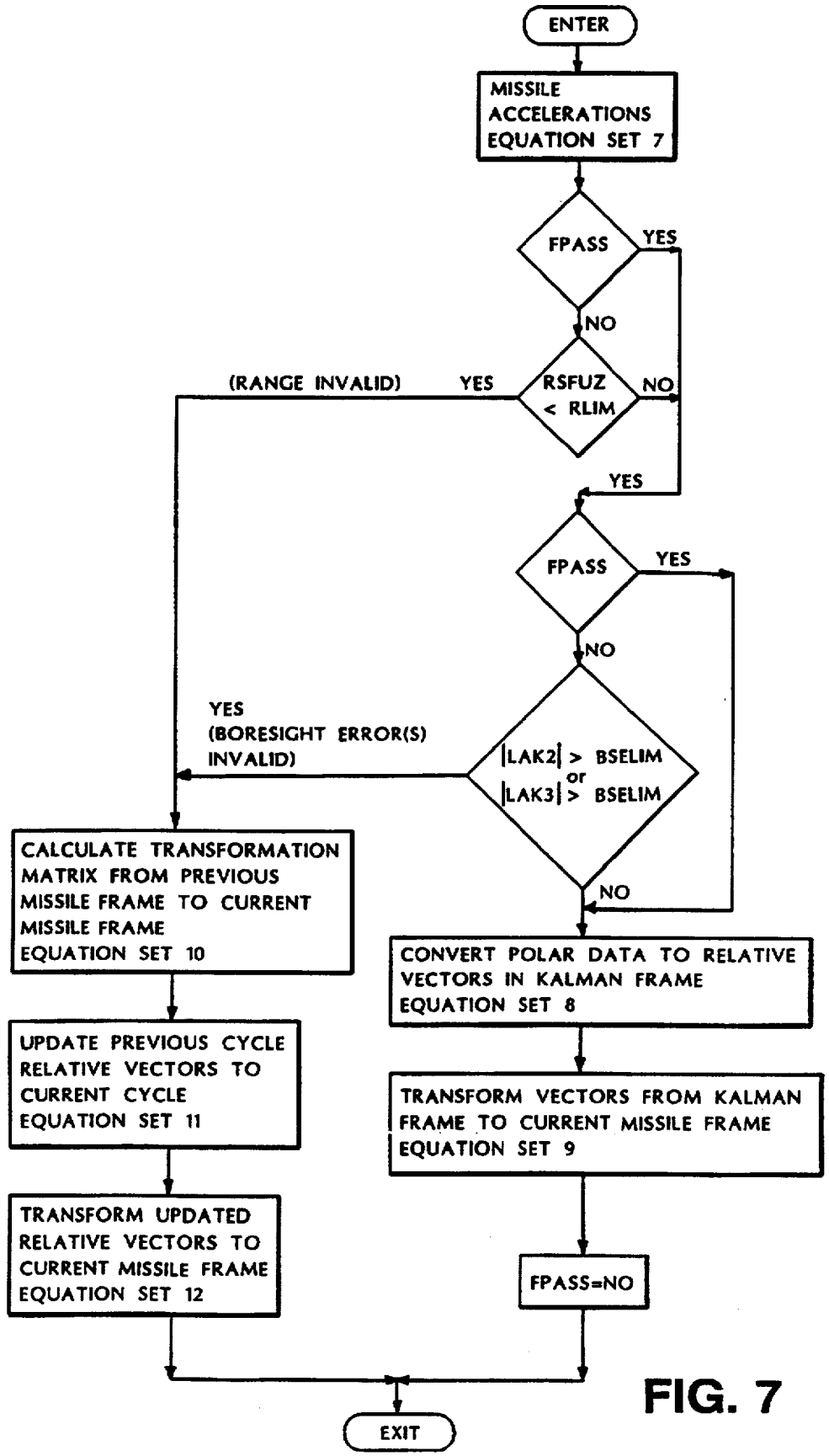
FIG. 7 is a flow diagram showing the steps performed by the processor of the guidance/fuzing computer in FIG. 3 in performing coordinate transformations from seeker/tracker coordinates to "current" missile body coordinates.

Note: The flag FPASS, (First Pass) must be initialized 'YES'. It is set 'NO' after completion of Equation Set 9 as shown in FIG. 7.

LOAD PREDICTED STATES FROM ACTIVE TRACK

More particularly, and referring to FIG. 6, on the first execution by the fuze system processor 80, the range filter predicted states are loaded from the range tracking filter 74:

Equation Set 1

$$RPFUZ=RTMP$$

$$RDPFUZ=RTMDP$$

$$NTRPFUZ=RTDDP$$

$$DTFILT=SDLTRD+T80$$

where: RTMP, RTMDP, RTDDP, and SDLTRD are the range filter states from the active track range filter; and, T80 is the radar cycle time interval (i.e., inverse of radar cycle rate).

CALCULATE SMOOTHING GAINS

The smoothing gains GFUZ, HFUZ, and KFUZ are set up for a critically damped filter as a function of the smoothing parameter BETA.

Equation Set 2

$$GFUZ=1.0-BETA^3$$

$$HFUZ=1.5*(1.0-BETA^2)*(1.0-BETA)$$

$$KFUZ=0.5*(1.0-BETA)^3$$

SMOOTH RANGE MEASUREMENTS

When an active range measurement is available, smoothed values for range, range velocity, and target acceleration along the range vector are determined.

Equation Set 3

$$RERR=RTMM-RPFUZ$$

$$RSFUZ=RPFUZ+GFUZ*RERR$$

$$RDSFUZ=RDPFUZ+HFUZ*RERR/DTFILT$$

$$NTRSFUZ=NTRPFUZ+2.0*KFUZ*RERR/DTFILT^2$$

$$DTFILT=T80$$

where:
RERR is the range prediction error.
RTMM is the active radar range measurement.
RSFUZ is the smoothed range state.
RDSFUZ is the smoothed active range velocity.
NTRSFUZ is the smoothed target acceleration along the range vector.

COAST RANGE FILTER

When an active range measurement is not available, (i.e., no target detection) the predicted range filter states from the previous radar cycle computer execution are used as the smoothed states for the current cycle. Also, the time between range measurements used in the smoothing equations is incremented.

Equation Set 4

$$RSFUZ=RPFUZ$$

$$RDSFUZ=RDPFUZ$$

$$NTRSFUZ=NTRPFUZ$$

$$DTFILT=DTFILT+T80$$

RELATIVE ACCELERATION USING TRACK OUTPUTS

The missile-to-target acceleration along the range vector determined using the range tracking filter output, NMA1.

Equation Set 5

$$RDDFUZ=NTRSFUZ-NMA1$$

where: NMA1 is the missile acceleration along the antenna 1 axis.

PREDICT RANGE FILTER STATES

The range filter states are predicted ahead for use in the next radar cycle computer execution.

Equation Set 6

$$RPFUZ=RSFUZ+RDSFUZ*T80+0.5*RDDFUZ*T80^2$$

$$RDPFUZ=RDSFUZ+RDDFUZ*T80$$

$$NTRPFUZ=NTRSFUZ$$

where: T80 is the radar cycle time interval (i.e., inverse of radar cycle rate).

CALCULATE RELATIVE VECTORS IN CURRENT MISSILE FRAME

This portion the computations (FIG. 7), determines relative warhead-to-target) position, velocity and acceleration vectors expressed in the current missile frame. The relative vectors are calculated with one of the following two methods:

1) If both the smoothed range and boresight error estimates are valid, the range filter states are combined with the active guidance Kalman filter outputs to give relative vectors in the Kalman frame. The vectors are then transformed from the Kalman frame to the current missile frame.

2) If the smoothed range and/or a boresight error estimate (s) is invalid, the relative vectors calculated in the previous radar cycle guidance/fuzing computer execution are updated to the current time and missile orientation. (Coasting of relative vectors).

Note: On the first execution of guidance/fuzing computer, method 1 must be chosen. The first pass flag (FPASS) is then set 'NO' after completion.

MISSILE ACCELERATIONS FROM A/D PROCESSING

More particularly, the Analog to digital processing uses 'held' missile accelerations from the Analog to Digital converter processing:

Equation Set 7

$$NMM1=NM1H$$

$$NMM2=NM2H$$

$$NMM3=NM3H$$

where: NM1H, NM2H, and NM3H are the missile accelerations held from the previous radar cycle.

CONVERT POLAR DATA TO RELATIVE VECTORS IN KALMAN COORDINATE FRAME

The range filter states are combined with the active guidance Kalman filter outputs to yield position and velocity vectors and the target acceleration vector in the Kalman frame. The active guidance Kalman filter outputs are components of the Zero Effort Miss distance, ZEM. (The ZEM is defined as the guidance miss distance which will result if the target 16 and the missile 12 do not change their velocity and acceleration states given the present position states between "now" and intercept").

Equation Set 8

$$RTMK2=RSFUZ*LAK3$$

$$RTMK3=-RSFUZ*LAK2$$

$$VTMK2=RSFUZ*LADK3+RDSFUZ*LAK3$$

$$VTMK3=-(RSFUZ*LADK2+RDSFUZ*LAK2)$$

$$RTMK1=RSFUZ*SQRT[1.0-LAK2-LAK3^2]$$

$$VTMK1=(RSFUZ*RDSFUZ-RTMK2*VTMK2-RTMK3*VTMK3)/RTMK1$$

$$NTK1=NTRSFUZ$$

where:
RTMK1 is missile-to-target range along the Kalman (i.e. seeker frame $X_k$, $Y_k$) 1 axis.
RTMK2 is missile-to-target range along the Kalman 2 axis.
RTMK3 is missile-to-target range along the Kalman 3 axis.
VTMK1 is missile-to-target velocity along the Kalman 1 axis.
VTMK2 is missile-to-target velocity along the Kalman 2 axis.
VTMK3 is missile-to-target velocity along the Kalman 3 axis.
NTK1 is the target acceleration along the Kalman 1 axis.
LAK2 and LAK3 are the LOS angle estimates.

TRANSFORM VECTORS FROM KALMAN FRAME TO CURRENT MISSILE COORDINATE FRAME

The relative position and velocity vectors and the target acceleration vector are transformed into the current missile frame using the antenna-to-missile transformation matrix, [MA]. (The Kalman frame is assumed to be coincident with the antenna 22 frame). The relative acceleration vector is determined by subtracting the missile accelerations from the target acceleration vector. Additionally, the relative position along the missile 1 axis is translated the distance, L, from the seeker 22 to the warhead 14.

Equation Set 9

$$RTWM1 = MA11H*RTMK1 + MA12H*RTMK2 + MA13H*RTMK3$$

$$RTWM2 = MA21H*RTMX1 + MA22H*RTMK2 + MA23H*RTMK3$$

$$RTWM3 = MA31H*RTMX1 + MA32H*RTEK2 + MA33H*RTMK3$$

$$VTWM1 = MA11H*VTMK1 + MA12H*VTMK2 + MA13H*VTMK3$$

$$VTWM2 = MA21H*VTMK1 + MA22H*VTMK2 + MA23H*VTMK3$$

$$VTWM3 = MA31H*VTMK1 + MA32H*VTMK2 + MA33H*VTMK3$$

$$NTM1 = MA11H*NTK1 + MA12H*NTK2 + MA13H*NTK3$$

$$NTM2 = MA21H*NTK1 + MA22H*NTK2 + MA23H*NTK3$$

$$NTM3 = MA31H*NTK1 + MA32H*NTK2 + MA33H*NTK3$$

$$ATWM1 = NTM1FUZ - NMM1$$

$$ATWM2 = NTM2FUZ - NMM2$$

$$ATWM3 = NTM3FUZ - NMM3$$

$$RTWM1 = RTWM1 + SKTOWR$$

where: MAnnH are elements of the antenna-to-missile transformation matrix [MA].

For a conventional two axis gimballed seeker where the elevation (E) axis gimbal is the first rotation from the missile body and the azimuth (A) axis gimbal is the second rotation, the [MA] elements are:

$$MA11H = COS\ A * COS\ E$$

$$MA12H = -SIN\ E$$

$$MA13H = SIN\ A * COS\ E$$

$$MA21H = COS\ A * SIN\ E$$

$$MA22H = COS\ E$$

$$MA23H = SIN\ A * SIN\ E$$

$$MA31H = -SIN\ A$$

$$MA32H = 0$$

$$MA33H = COS\ A$$

RTWM1 is the warhead-to-target range along the missile ($X_M$, $Y_M$) 1 axis.
RTWM2 is the warhead-to-target range along the missile 2 axis.
RTWM3 is the warhead-to-target range along the missile 3 axis.
VTWM1 is the warhead-to-target velocity along the missile 1 axis.
VTWM2 is the warhead-to-target velocity along the missile 2 axis.
VTWM3 is the warhead-to-target velocity along the missile 3 axis.
NTM1 is the target acceleration along the missile 1 axis.
NTM2 is the target acceleration along the missile 2 axis.
NTM3 is the target acceleration along the missile 3 axis.
NTK2 is the target acceleration along the Kalman 2 axis.
NTK3 is the target acceleration along the Kalman 3 axis.
ATWM1 is the warhead-to-target acceleration along the missile 1 axis.
ATWM2 is the warhead-to-target acceleration along the missile 2 axis.
ATWM3 is the warhead-to-target acceleration along the missile 3 axis.
SKTOWR is the distance from the seeker to the warhead.

CALCULATE TRANSFORMATION MATRIX FROM PREVIOUS MISSILE COORDINATE FRAME TO CURRENT MISSILE COORDINATE FRAME

When the relative vectors in the missile frame are to be coasted, the transformation matrix [ML] from the previous cycle's missile frame to the current missile frame is calculated. Missile body rates held from the previous radar cycle guidance/fuzing computer execution are integrated over a radar cycle time interval and a transformation matrix is constructed from the resulting changes in missile roll, pitch, and yaw:

Equation Set 10

$$FIML = WM1CST*T80$$

$$THML = WM3CST*T80$$

$$SIML = WM2CST*T80$$

$$CFIML = COS[FIML]$$

$$SFIML = SIN[FIML]$$

$$CTHML = COS[THML]$$

$$STHML = SIN[THML]$$

$$CSIML = COS[SIML]$$

$$SSIML = SIN[SIML]$$

$$ML11 = CTHML*CSIML$$

$$ML12 = STHML$$

$$ML13 = -CTHML*SSIML$$

$$ML21 = -CFIML*STHML*CSIML + SFIML*SSIML$$

$$ML22 = CFIML*CTHML$$

$$ML23 = CFIML*STHML*SSIML + SFIML*CSIML$$

$$ML31 = SFIML*STHML*CSIML + CFIML*SSIML$$

$$ML32 = -SFIML*CTHML$$

$$ML33 = -SFIML*STPIML*SSIML + CFIML*CSIML$$

where: WM1CST is the roll body rate from the previous guidance/fuzing computer 26 execution.
WM2CST is the yaw body rate from the previous guidance/fuzing execution.
WM3CST is the pitch body rate from the previous guidance/fuzing computer execution.
FIML is the roll angle between the last missile frame and the current missile frame.
THML is the pitch angle between the last missile frame and the current missile frame.
SIML is the yaw angle between the last missile frame and the current missile frame.
MLnn are elements of the last missile frame to current missile frame transformation matrix.

UPDATE PREVIOUS CYCLE RELATIVE VECTORS TO CURRENT CYCLE

As part of the relative vector coasting process, the relative position and velocity vectors and the target acceleration vector from the previous cycle are updated (integrated) to the current time.

Equation Set 11

$$RTWM1U = RTWM1 + T80 \cdot VTWM1 + 0.5 \cdot T80^2 \cdot ATWM1$$

$$RTWM2U = RTWM2 + T80 \cdot VTWM2 + 0.5 \cdot T80^2 \cdot ATWM2$$

$$RTWM3U = RTWM3 + T80 \cdot VTWM3 + 0.5 \cdot T80^2 \cdot ATWM3$$

$$VTWM1U = VTWM1 + T80 \cdot ATWM1$$

$$VTWM2U = VTWM2 + T80 \cdot ATWM2$$

$$VTWM3U = VTWM3 + T80 \cdot ATWM3$$

$$NTM1U = NTM1$$

$$NTM2U = NTM2$$

$$NTM3U = NTM3$$

where: RTWM1U, RTWM2U, and RTWM3U is the updated warhead-to-target range vector updated to the current time but still in warhead/missile frame of the previous radar cycle.

VTWM1U, VTWM2U, and VTWM3U is the corresponding updated warhead-to-target velocity vector.

NTM1U, NTM2U, and NTM3U is the corresponding updated target acceleration vector.

TRANSFORM UPDATED RELATIVE VECTORS TO CURRENT MISSILE COORDINATE FRAME

To complete the coasting of the relative position and velocity vectors and the target acceleration vector, the updated vectors which are still in the last cycle's missile frame are transformed into the current missile frame. The relative position vector is translated to the missile center of gravity (CG) before the transformation and translated back to the warhead afterwards. The current missile accelerations are subtracted from the target acceleration vector yielding the relative acceleration vector.

Equation Set 12

$$RTWM1U = RTWM1U + WRTOCG$$

$$RTWM1 = ML11 \cdot RTWM1U + ML12 \cdot RTWM2U + ML13 \cdot RTWM3U$$

$$RTWM2 = ML21 \cdot RTWM1U + ML22 \cdot RTWM2U + ML23 \cdot RTWM3U$$

$$RTWM3 = ML31 \cdot RTWM1U + ML32 \cdot RTWM2U + ML33 \cdot RTWM3U$$

$$VTWM1 = ML11 \cdot VTM21U + ML12 \cdot VTWM2U + ML13 \cdot VTWM3U$$

$$VTWM2 = ML21 \cdot VTWM1U + ML22 \cdot VTWM2U + ML23 \cdot VTWM3U$$

$$VTWM3 = ML31 \cdot VTWM1U + ML32 \cdot VTWM2U + ML33 \cdot VTWM3U$$

$$NTM1FUZ = ML11 \cdot NTM1U + ML12 \cdot NTM2U + ML13 \cdot NTM3U$$

$$NTM2FUZ = ML21 \cdot NTM1U + ML22 \cdot NTM2U + ML23 \cdot NTM3U$$

$$NTM3FUZ = ML31 \cdot NTM1U + ML32 \cdot NTM2U + ML33 \cdot NTM3U$$

$$RTWM1 = RTWM1 - WRTOCG$$

$$ATWM1 = NTM1 - NMM1$$

$$ATWM2 = NTM2 - NMM2$$

$$ATWM3 = NTM3 - NMM3$$

where: WRTOCG is the distance from the warhead and the missile CG.

CALCULATE RELATIVE VECTORS IN MISSILE COORDINATE FRAME AT TIME OF FRAGMENT/TARGET IMPACT

Figure 8:
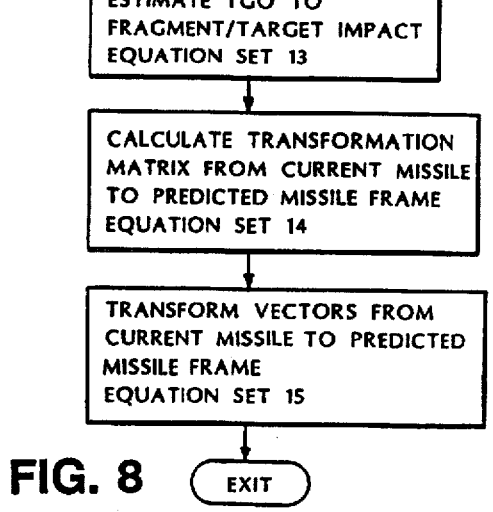
FIG. 8 is a flow diagram showing the steps used by the processor of the guidance/fuzing computer in performing coordinate transformations from "current" missile body coordinates to "predicted" missile body coordinates and to calculate the relative vectors in missile body coordinates at the expected time of impact.

This portion of processing, as shown in FIG. 8, accounts for changes in missile orientation between the current time and the time that the warhead is detonated which is approximated by the time at which the fragment impacts the target.

ESTIMATE TGO TO FRAGMENT/TARGET IMPACT

The time-to-go to the fragment/target impact is a function of the missile orientation at the time of the fragment/target impact. An estimate of the time-to-go is determined by solving for when the relative range along the current missile 1 axis goes to zero from the following equation:

$$RTWM1 + VTWM1 \cdot WTGOEST + 0.5 \cdot ATWM1 \cdot WTGOEST^2 = 0$$

Equation Set 13

$$TEMP1 = (-RTWM1 \cdot ATWM1)/(2.0 \cdot VTWM1^2)$$

$$WTGOEST = (-RTWM1/VTWM1) \cdot (1.0 + TEMP1 + 2.0 \cdot TEMP1^2)$$

where:

TEMP1 is an intermediate of the WTGOEST calculation; and,

WTGOEST is an estimate of the time-to-go to the fragment/target impact.

This estimated time-to-go is used to predict the missile orientation ahead to the instant of fragment/target impact in Equation Sets 14 and 15, below. The final time-to-go will be computed in Equation Set 16, below.

CALCULATE TRANSFORMATION MATRIX FROM CURRENT MISSILE TO PREDICTED MISSILE COORDINATE FRAME

The missile body rates are integrated over the estimated time-to-go to yield changes in roll, pitch and yaw between the current missile frame and the missile frame predicted for the time of warhead detonation. The transformation matrix |PM| is constructed using the roll, pitch and yaw angles between the two frames.

Equation Set 14

$$FIPM = WM1H \cdot WTGOEST$$

$$THPM = WM3H \cdot WTGOEST$$

$$SIPM = WM2H \cdot WTGOEST$$

$$CFIPM = COS[FIPM]$$

$$SFIPM = SIN[FIPM]$$

$$CTHPM = COS[THPM]$$

$$STHPM = SIN[THPM]$$

$$CSIPM = COS[SIPM]$$

$$SSIPM = SIN[SIPM]$$

$$PM11 = CTHPM \cdot CSIPM$$

$$PM12 = STHPM$$

$PM13=-CTHPM*SSIPM$ $PM21=-CFIPM*STHPM*CSIPM+SFIPM*SSIPM$ $PM22=CFIPM*CTHPM$ $PM23=-CFIPM*STHPM*SSIPM+SFIPM*CSIPM$ $PM31=SFIPM*STHPM*CSIPM+CFIPM*SSIPM$ $PM32=-SFIPM*CTHPM$ $PM33=-SFIPM*STHPM*SSIPM+CFIPM*CSIPM$ where: WM1H, WM2H and WM3H are the roll, yaw and pitch body rates held by the A/D processing;
FIPM, THPM and SIPM are the roll, pitch and yaw angles between the current missile frame and the predicted missile frame; and,
PMnn are elements of the current to predicted missile frame transformation matrix, |PM|.

TRANSFORM VECTORS FROM CURRENT MISSILE TO PREDICTED MISSILE COORDINATE FRAME

The relative vectors in the current missile frame are transformed into the missile frame predicted for the time of warhead detonation.

Equation Set 15

$RTWM1=RTWM1+WRTOCG$ $RTWP1=PM11*RTWM1+PM12*RTWM2+PM13*RTWM3$ $RTWP2=PM21*RTWM1+PM22*RTWM2+PM23*RTWM3$ $RTWP3=PM31*RTWM1+PM32*RTWM2+PM33*RTWM3$ $VTWP1=PM11*VTWM1+PM12*VTWM2+PM13*VTWM3$ $VTWP2=PM21*VTWM1+PM22*VTWM2+PM23*VTWM3$ $VTWP3=PM31*VTWM1+PM32*VTWM2+PM33*VTWM3$ $ATWP1=PM11*ATWM1+PM12*ATWM2+PM13*ATWM3$ $ATWP2=PM21*ATWM1+PM22*ATWM2+PM23*ATWM3$ $ATWP3=PM31*ATWM1+PM32*ATWM2+PM33*ATWM3$ $RTWP3=RTWP1-WRTOCG$ where:
RTWP1, RTWP2 and RTWP3 is the warhead-to-target range vector in the predicted missile frame.
VTWP1, VTWP2 and VTWP3 is the warhead-to-target velocity vector in the predicted missile frame.
ATWP1, ATWP2 and ATWP3 is the warhead-to-target acceleration vector in the predicted missile frame.

CALCULATE TIME-TO-GO FRAGMENT/ TARGET IMPACT WARHEAD MISS VECTOR

Figure 9:
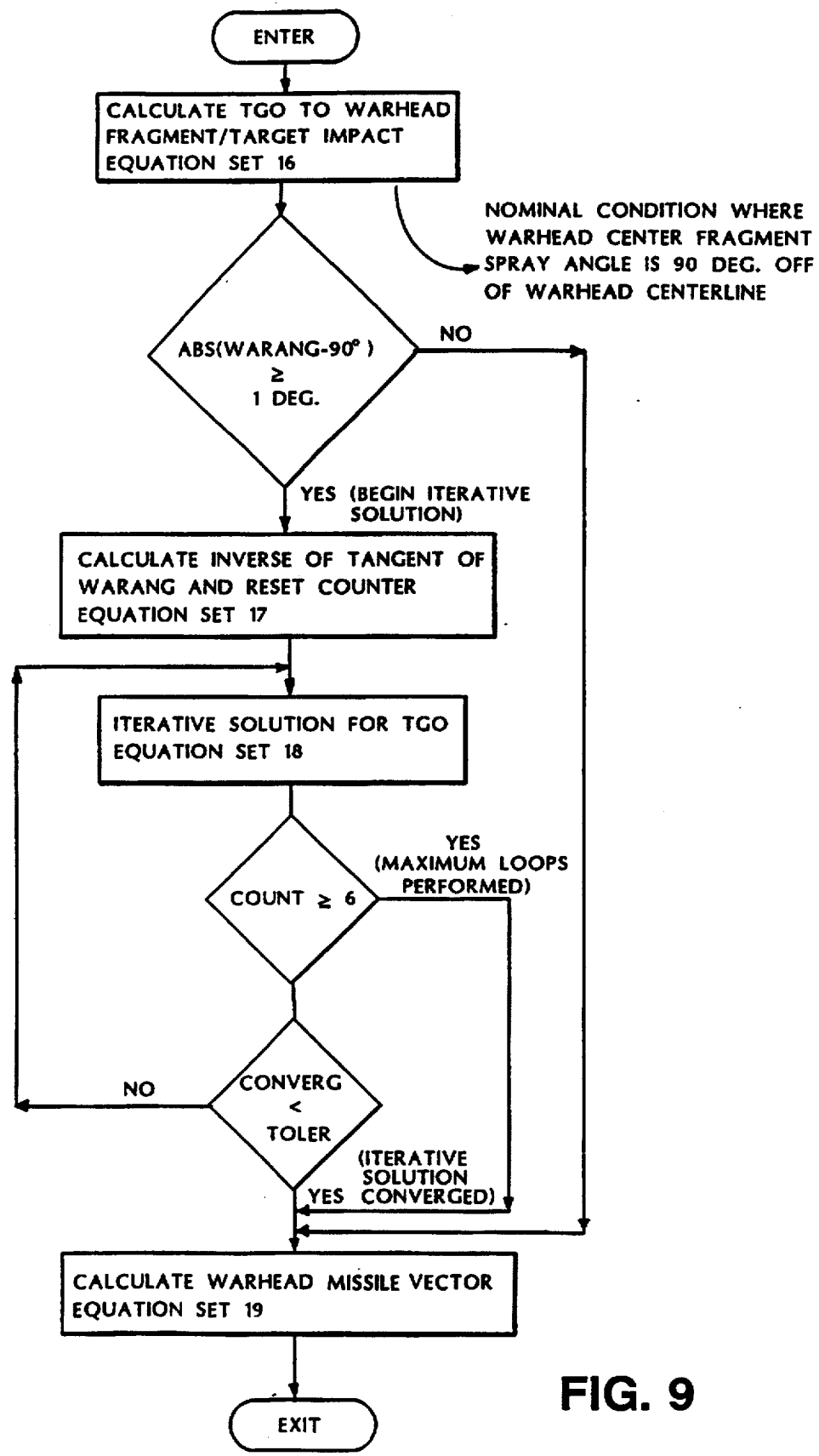
FIG. 9 is a flow diagram showing the steps performed by the processor of the guidance/fuzing computer in FIG. 3 in determining a the time-to-go to fragment/target impact and warhead miss distance.

Referring now to FIG. 9, the processor 80 solves for the time-to-go to the warhead fragment impacting on the target and the distance between the warhead and the target (warhead miss) at that time.

The warhead 14 is modelled by the fuze as a cone of fragments ejected from the warhead at some angle off the warhead center-line. For the nominal case where the warhead cone angle (WARANG) is 90 degrees, the solution for the time-to-go is relatively simple. When the warhead cone angle is not 90 degrees an iterative solution must be performed to determine the time-to-go. The iterative solution is performed until the time-to-go converges or a maximum number of iterations is reached.

CALCULATE TGO TO WARHEAD FRAGMENT/ TARGET IMPACT

For the nominal case where the warhead cone angle is 90 degrees, the time-to-go to the fragment/target impact is the time it takes for the relative range along the predicted missile frame 1 axis to go to zero, thus:

$RTWP1+VTWP1*WTGO+0.5*ATWP1*WTGO^2=0$

The solution of this equation is approximated by:

Equation Set 16

$TEMP2=(RTWP1*ATWP1)/(2.0*VTWP1^2)$ $WTGO=(-RTWP1/VTWP1)*(1.0+TEMP2+2.0*TEMP2^2)$ where: TEMP2 is an intermediate in the calculation of WTGO
WTGO is the time-to-go to the warhead fragment/ target impact.

CALCULATE INVERSE OF TANGENT OF WARANG AND RESET COUNTER

The inverse of the tangent of the warhead cone angle (ITAN) is used in the iterative solution for the time-to-go to the fragment/target impact when the warhead cone angle is not 90 degrees. Also, the counter for the number of iterations performed (COUNT) is reset to zero:

Equation Set 17

$ITAN=COS[WARANG]/ABS[SIN[WARANG]]$ $COUNT=0$

ITERATIVE SOLUTION FOR TGO

The convergence of the iterative solution for the time-to-go fragment/target impact is checked by taking the difference of the previous time-to-go and the new value and comparing it to a minimum acceptable tolerance. In addition, a counter is implemented to limit the number of passes in case the solution is not converging:

Equation Set 18

$COUNT=COUNT+1$ $OLDTGO=WTGO$ $TEMP3=(RTWP2+VTWP2*WTGO+0.5*ATWP2*WTGO^2)^2$ $TEMP4=(RTWP3+VTWP3*WTGO+0.5*ATWP3*WTGO^2)^2$ $TEMP5=-RTWP1+0.5*ATWP1*WTGO^2$ $TEMP6=VTWP1+ATWP1*WTGO$ $WTGO=(ITAN*SQRT[TEMP3+TEMP4]+TEMP5)/TEMP6$ $CONVRG=ABS[OLDTGO-WTGO]$ where: OLDTGO is the previous interation's WTGO.
TEMP3, TEMP4, TEMP5, and TEMP6 are WTGO intermediates.
CONVRG is the convergence of WTGO.

CALCULATE WARHEAD MISS VECTOR

The relative range vector is evaluated at the time-to-go to fragment/target impact by integrating the relative states over the time-to-go. This yields the warhead miss vector (warhead-to-target relative range) in the predicted missile frame. In addition, the magnitude of the warhead miss vector and the angle of the vector about the predicted missile frame 1 axis are calculated for later use:

Equation Set 19

$$WMSP1 = RTWP1 + VTWP1*WTGO + 0.5*ATWP1*WTGO^2$$

$$WMSP2 = RTWP2 + VTWP2*WTGO + 0.5*ATWP2*WTGO^2$$

$$WMSP3 = RTWP3 + VTWP3*WTGO + 0.5*ATWP3*WTGO^2$$

$$WMSMAG = SQRT[WPSP12 +, WMSP22 + WMSP32]$$

$$WMSANG = ATAN2[WMSP3, WMSP2]$$

where:
WMSP1 is the warhead miss along the predicted missile 1 axis.
WMSP2 is the warhead miss along the predicted missile 2 axis.
WMSP3 is the warhead miss along the predicted missile 3 axis.
WMSMAG is the magnitude of the warhead miss vector.
WMSANG is the angle of the warhead miss vector about the predicted missile frame 1 axis.

The WMSP2 and WMSP3 are the major components of warhead miss. The WMSP1 is relatively small.

SELECT WARHEAD(S) TO DETONATE AND CALCULATE FRAGMENT VELOCITY

Figure 10:
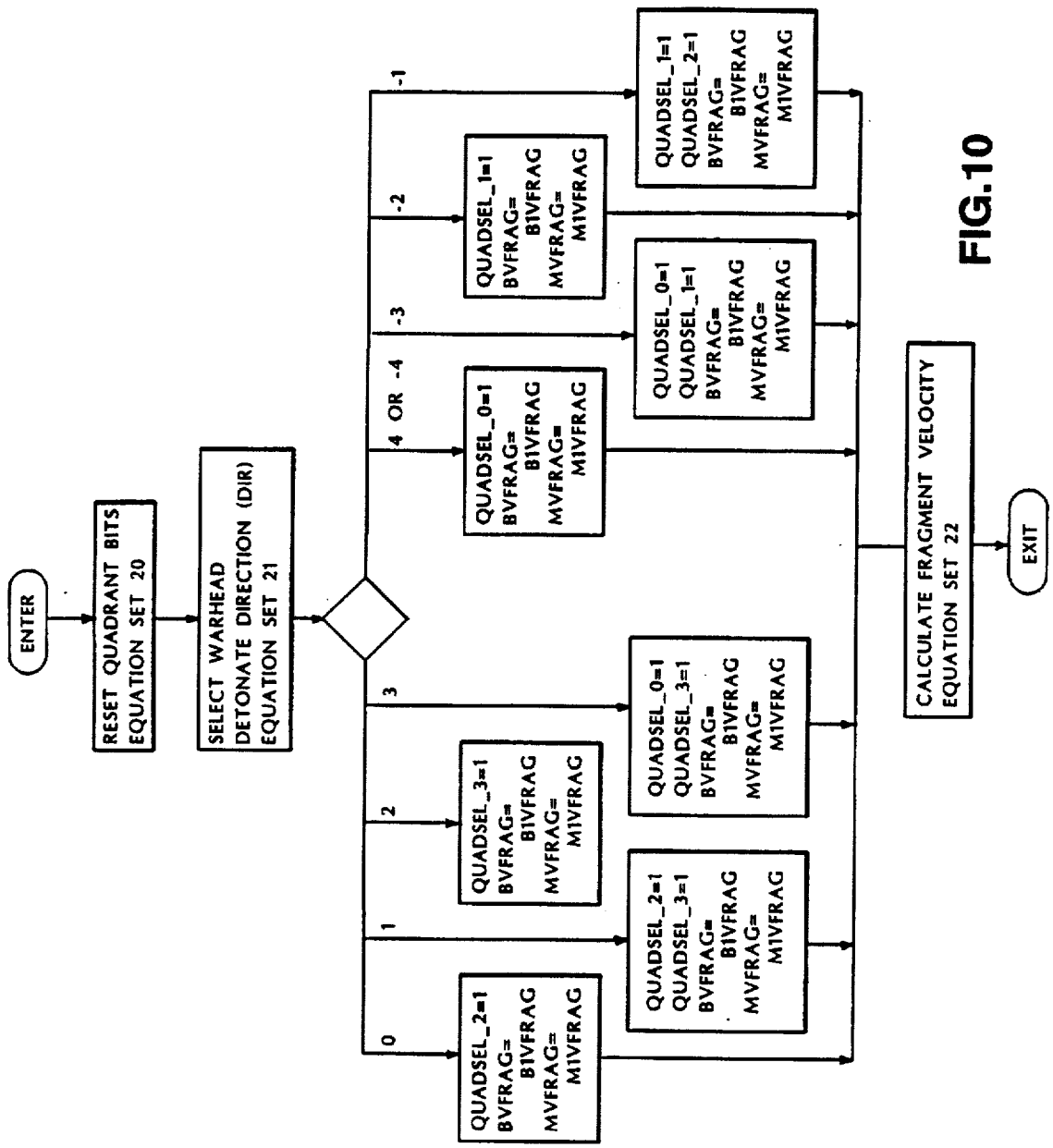
FIG. 10 is a flow diagram showing the steps used by the processor of the guidance/fuzing computer to select warhead quadrant and calculate fragment velocity from data base fragment velocities for the selected warhead quadrant.

Referring now to FIG. 10, the processor 80 selects the warhead quadrant(s) to detonate and calculates the fragment velocity.

The warhead has four detonators, one in each quadrant of the shell. The fragments ejected across from the quadrant detonated have the highest kinetic energy. It is desirable to have these high velocity fragments impacting the target, so it is a task of the fuze to select the appropriate quadrant(s) to detonate. By detonating either one quadrant or two adjacent quadrants, the warhead has 8 directions of fire located at 45 degrees increments around the warhead center-line. Each quadrant detonator is represented by a bit in the four bit word QUADSEL which is used to transport the quadrant detonators selected to the safe and arm device.

RESET QUADRANT BITS

The bits of the warhead quadrant detonate select output word (QUADSEL) are cleared:

Equation Set 20

$$QUETZAL\_0 = 0$$

$$QUETZAL\_1 = 0$$

$$QUETZAL\_2 = 0$$

$$QUETZAL\_3 = 0$$

SELECT WARHEAD DETONATION DIRECTION (DIR)

The orientation of the target with respect to the warhead center-line is specified by the angle of the warhead miss vector about the predicted missile frame 1 axis (WMSANG). The warhead fire direction which is closest to the angle WMSANG is determined. The warhead detonate bits are set based on the direction chosen as seen in FIG. 10. In addition, the angle between the fire direction selected and the warhead miss vector about the predicted missile 1 axis is computed for use in the fragment velocity calculation:

Equation Set 21

$$DIR = INT[(WMSANG*1.2732396) + 0.5]$$

$$WANGDIF = ABS [DIR*0.7853982 - WMSANG]$$

where: WANGDIF is the angle between the warhead fire direction and the warhead miss vector about the predicted missile 1 axis.

CALCULATE FRAGMENT VELOCITY

The fragment velocity along the direction of fire (BVFRAG) is dependent upon the number of quadrants detonated. The fragment velocity is then adjusted for the position of the fragment expected to impact the target. This is done by multiplying the angle between the warhead fire direction and warhead miss vector with the slope of the fragment velocity versus the angle about the warhead center-line (MVFRAG). MVFRAG is also dependent on the number of quadrants detonated:

Equation Set 22

$$VFRAG = BVFRAG + MVFRAG*WANGDIF$$

CALCULATE FUZE COUNTER VALUE

The final portion of the processing, shown in FIG. 11, involves the calculation of fuze time delay and the conversion of the fuze time delay to the value to be loaded in the 100 khz digital count-down timer. The Enable FUZE Indicator (ENFUZE) is set if the uplinked FUZE Detonate Enable (FUZDET) message has been received and if the count-down timer value (FCOUNT) does not exceed the maximum and minimum allowed values. ENFUZE signals the digital count-down timer that a new valid fuze delay counter value exists.

The count-down timer 50 is loaded with a 16 bit unsigned number. Given a 100 kHz clock rate and the 16 bit input word, the maximum allowable time delay is 0.6553 seconds (rounded to 0.65 seconds for convenience). As the input word is unsigned, negative time delays are not allowed.

CALCULATE FRAGMENT TRAVEL TIME

The fragment travel time is determined by dividing the fragment travel distance by the fragment velocity. The fragment travel distance is the magnitude of the warhead miss vector minus the radius of the warhead:

Equation set 23

$$TFRAG = (WMSMAG - WARRAD)/VFRAG$$

where: WARRAD is the warhead radius.

CALCULATE WARHEAD BURST TIME DELAY

The burst time delay is the time-to-go to the fragment/target impact "led" by the fragment travel time:

Equation Set 24

$$DTBURST = WTGO - TFRAG$$

CALCULATE FUZE TIME DELAY

The fuze time delay is the first time delay adjusted for the lag between when the measurement data are valid and when the count-down timer is loaded with the count-down value. The fuze delay also takes into account the reaction time of the warhead (fire pulse to fragment ejection elapsed time):

Equation Set 25

$$DTFUZE=DTBURST-CYCLAG$$

$$DTFUZE=DTFUZE-DELAYS$$

$$FOUNT=INT\ [(DTFUZE*100000.0)+0.5]$$

where: CYCLAG is the time between data measurement and timer loading.
DELAYS is the reaction time of the warhead.

SAVE BODY RATES FOR COASTING

Before completing processing, the current 'held' body rates are saved for the possibility of coasting the relative vectors in the next radar cycle's fuze execution:

Equation Set 26

$$WM1CST=WM1H$$

$$WM2CST=WM2H$$

$$WM3CST=WM3H$$

PROCESSOR 80 OUTPUTS TO FUZE SECTION 33

The processing generates three outputs, which are summarized in TABLE 4:

TABLE 4

| | OUTPUTS | |
|---|---|---|
| ACRONYM | DESCRIPTION | UNITS |
| FOUNT | Fuze Countdown Timer Value | — |
| ENFUZE | Enable Fuze Indicator | — |
| QUADSEL | Quadrant Select Bits | — |

Enable Fuze Indicator (ENFUZE) is a flag which signals the digital count-down timer that a new count-down timer value is available. Fuze Count-down Timer value is the value to be loaded in the 100 kHz count-down timer. Quadrant Select Bits (QUADSEL) are used by the safe and arm device to enable warhead quadrant detonators.

Other embodiments are within the spirit and scope of the appended claims.

What is claimed is:

1. A fuzing system adapted for use by a guided missile to generate a detonation signal for a warhead carried by the missile, such system comprising:
   a seeker/tracking system for producing signals to track the target and direct the missile towards the target, such seeker/tracking system including:
   a seeker, gimballed with respect to the body of the missile, for producing a signal representative of the angular deviation between the line of sight to the target and the boresight axis of the seeker/target tracking system; and,
   a ranging system for producing a signal representative of the range between the target and the missile; and,
   a computer for providing, in response to the seeker/ranging system produced signals and data representative of the distance between the seeker and the warhead, a detonation signal for the warhead.

2. The fuzing system recited in claim 1 wherein the computer, in response to the range signal and angle deviation signal measured at a seeker of the seeker/tracker, transforms such measured signals from seeker based coordinates to coordinates based at the warhead, to produce, in the warhead based coordinates, a time-to-go signal, $t_{go}$, where $t_{go}$ is related to the range between the missile and the target divided by the rate of change in such range, the time-to-go signal $t_{go}$ representing the time remaining before the missile intercepts the target.

3. The fuzing system recited in claim 2 wherein the computer produces a fragment time signal, such fragment time signal being related to the predetermined fragment velocity divided by the warhead to target miss distance.

4. A fuzing system comprising:
   a system adapted to track and direct a missile towards a target, such system comprising:
   a seeker, gimballed with respect to the body of the missile, to produce a line of sight angle signal representative of a line of sight angle between the missile and the target; and a ranging system to produce a range signal representative of a range between the target and the missile; and,
   a processor comprising:
   means, in response to the seeker and ranging system produced signals, for determining a detonation signal for the warhead;
   means, in response to the range signal, for producing a time-to-go signal, $t_{go}$, where $t_{go}$ is related to the range between the missile and the target divided by the rate of change in such range, such time-to-go signal representing the time remaining before the missile intercepts the target;
   means, in response to the range signal and the line of sight angle signal a miss distance signal representative of a predicted distance, normal to the line of sight, at the time remaining before the missile intercepts the target;
   means for producing a fragment velocity signal representative of the velocity of fragments of the warhead after such warhead receives a detonation signal; and
   means for producing the detonation signal in response to the miss distance signal and the fragment velocity signal; and
   wherein the missile seeker is gimballed with respect to the body of the missile at a different location in the missile from the warhead, and wherein the processor, in response to signals representative of the gimballed position of the seeker and data representative of the difference in location between the seeker and the warhead, provides the miss distance signal.

5. A fuzing system comprising:
   a system adapted to track and direct a missile having a warhead towards a target, such system comprising:
   a seeker means, gimballed with respect to the body of the missile, for producing a signal representative of the angular deviation between the target and the missile; and a ranging system means for producing a signal representative of a range between the target and the missile; and,
   a processor for determining, in response to the seeker means and ranging system means produced signals, a detonation signal for the warhead,
   wherein the missile includes instrumentation for measuring the acceleration and angular rotation of the missile and the angular rotation of the seeker relative to the body of the missile and means for producing signals representative of such measurements, and wherein such signals are fed to the processor, such processor including such signals in estimating the miss distance: and wherein data is provided representative of the distance between the seeker and the warhead, and wherein the processor uses such data in generating the detonation signal.

6. The system recited in claim 5 wherein the processor in response to measurements of the seeker gimbals angles and the distance between the warhead and the seeker, determines a warhead miss distance.

7. The system recited in claim 6 wherein the processor determines the total time to warhead center fragment impact with the target, and generates the detonation signal in accordance with such determination.

8. The system recited in claim 7 wherein the processor, in response to a signal representative of the center fragment velocity, determines to fragment travel time to reach the target, and generates the detonation signal in accordance with such determination.

9. The system recited in claim 8 wherein the processor includes a count-down timer, and wherein the processor processes the difference between the total time and the fragment time, to determine the warhead burst time delay, and loads such difference in the count-down timer.

10. The system recited in claim 9 wherein the processor includes a clock to count down the count down timer, and, in response to the count of the count-down counter initiates the detonation signal.

* * * * *